(12) United States Patent
Abe et al.

(10) Patent No.: US 10,941,608 B2
(45) Date of Patent: Mar. 9, 2021

(54) GLASS PANEL UNIT AND GLASS WINDOW

(71) Applicant: Panasonic Intellectual Property Management Co., Ltd., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/600,195

(22) Filed: Oct. 11, 2019

(65) Prior Publication Data

US 2020/0109594 A1 Apr. 9, 2020

Related U.S. Application Data

(63) Continuation of application No. 15/763,947, filed as application No. PCT/JP2016/004182 on Sep. 14, 2016, now Pat. No. 10,487,568.

(30) Foreign Application Priority Data

Sep. 29, 2015 (JP) .................................. 2015-191952

(51) Int. Cl.
   *E06B 3/663* (2006.01)
   *C03C 27/06* (2006.01)
   (Continued)

(52) U.S. Cl.
   CPC ............ *E06B 3/66304* (2013.01); *B32B 3/18* (2013.01); *B32B 7/12* (2013.01); *B32B 17/064* (2013.01);
   (Continued)

(58) Field of Classification Search
   CPC .... E06B 3/66304; E06B 3/667; E06B 3/6775; E06B 3/67334; E06B 3/6612;
   (Continued)

(56) References Cited

U.S. PATENT DOCUMENTS 5,643,644 A 7/1997 Demars
6,071,575 A 6/2000 Collins et al.
(Continued)

FOREIGN PATENT DOCUMENTS

FR 2752012 B3 8/1998
JP H08-165148 A 6/1996
(Continued)

OTHER PUBLICATIONS

International Search Report issued in Application No. PCT/JP2016/004182 dated Dec. 20, 2016, with English translation.
(Continued)

*Primary Examiner* — Babajide A Demuren
(74) *Attorney, Agent, or Firm* — McDermott Will & Emery LLP

(57) ABSTRACT

A glass panel unit including a first panel including at least a first glass plate; a second panel arranged to face the first panel and including at least a second glass plate; a frame member formed in a shape of a frame, corresponding in shape to respective peripheral portions of the first panel and the second panel extending along edges thereof, and bonded to the peripheral portions; and at least one spacer provided in a vacuum space between the first panel and the second panel. The at least one spacer containing a polyimide, where the polyimide has an absorption edge at which an absorption index decreases in an optical absorption spectrum ranging from an ultraviolet ray to visible radiation, the absorption edge being equal to or less than 400 nm, and the polyimide
(Continued)

includes at least one selected from the group consisting of a fluorine group and a chlorine group.

7 Claims, 9 Drawing Sheets

(51) Int. Cl.
    *C09J 1/00*     (2006.01)
    *C08G 73/10*     (2006.01)
    *B32B 3/18*     (2006.01)
    *B32B 7/12*     (2006.01)
    *B32B 17/06*     (2006.01)
    *B32B 27/28*     (2006.01)
    *E06B 3/66*     (2006.01)
    *E06B 3/667*     (2006.01)
    *E06B 3/673*     (2006.01)
    *E06B 3/677*     (2006.01)
    *E06B 3/67*     (2006.01)

(52) U.S. Cl.
    CPC ............ *B32B 27/281* (2013.01); *C03C 27/06* (2013.01); *C08G 73/10* (2013.01); *C08G 73/1039* (2013.01); *C09J 1/00* (2013.01); *E06B 3/663* (2013.01); *E06B 3/667* (2013.01); *E06B 3/6612* (2013.01); *E06B 3/66333* (2013.01); *E06B 3/6775* (2013.01); *E06B 3/67334* (2013.01); *B32B 2419/00* (2013.01); *E06B 3/6715* (2013.01); *Y02A 30/249* (2018.01); *Y02B 80/22* (2013.01)

(58) Field of Classification Search
    CPC .... E06B 3/66333; E06B 3/6715; E06B 3/663; C03C 27/06; B32B 27/281; C08G 73/10
    See application file for complete search history.

(56) References Cited

U.S. PATENT DOCUMENTS

| | | |
|---|---|---|
| 6,541,084 B2 | 4/2003 | Wang |
| 6,830,791 B1 | 12/2004 | Misonou et al. |
| 8,512,830 B2 | 8/2013 | Bettger et al. |
| 2002/0106463 A1 | 8/2002 | Wang et al. |
| 2007/0051461 A1 | 3/2007 | Pfleging et al. |
| 2012/0088045 A1 | 4/2012 | Veerasamy |
| 2012/0315409 A1 | 12/2012 | Jones |
| 2013/0000232 A1 | 1/2013 | Weiss et al. |
| 2016/0214903 A1 | 7/2016 | Humpal et al. |

FOREIGN PATENT DOCUMENTS

| | | |
|---|---|---|
| JP | H09-095533 A | 4/1997 |
| JP | 2000-087656 A | 3/2000 |
| JP | 2002-226237 A | 8/2002 |
| JP | 2009-286876 A | 12/2009 |
| JP | 2009-286877 A | 12/2009 |
| JP | 2010-007034 A | 1/2010 |
| JP | 2013-127639 A | 6/2013 |
| JP | 2013-163304 A | 8/2013 |
| JP | 2014-024894 A | 2/2014 |
| TW | 400411 B | 8/2000 |
| TW | 201336679 A | 9/2013 |
| WO | 2013/008724 A1 | 1/2013 |

OTHER PUBLICATIONS

Non-Final Office issued in U.S. Appl. No. 15/763,947, dated Feb. 8, 2019.

Notice of Allowance issued in U.S. Appl. No. 15/763,947, dated Jul. 12, 2019.

GLASS PANEL UNIT AND GLASS WINDOW

RELATED APPLICATIONS

This application is a continuation of U.S. patent application Ser. No. 15/763,947, filed on Mar. 28, 2018, now U.S. Pat. No. 10,487,568, which is the U.S. National Phase under 35 U.S.C. § 371 of International Application No. PCT/JP2016/004182, filed on Sep. 14, 2016, which in turn claims the benefit of Japanese Application No. 2015-191952, filed on Sep. 29, 2015, the disclosures of which are incorporated in their entirety by reference herein.

TECHNICAL FIELD

The present invention relates to glass panel units and glass windows.

BACKGROUND ART

A glass panel having a vacuum space between a pair of glass plates (hereinafter referred to as a "vacuum glass panel") has been known in the art. The vacuum glass panel is also called a "multilayered glass pane." The vacuum glass panel has excellent thermal insulation properties because the vacuum space reduces heat conduction. When a vacuum glass panel is manufactured, two glass plates to form a pair are bonded together with a gap left between them, the space between the pair of glass plates is evacuated, and the inner space is sealed hermetically, thus forming a vacuum space there.

It has been proposed that spacers be used to maintain a sufficient thickness for the vacuum space of such a vacuum glass panel. The spacers are members to be interposed between the two glass plates. The spacers are required to have some strength, and therefore, a metal is one of well-known materials for the spacers. Meanwhile, spacers made of a polymer have also been disclosed as in Patent Literature 1, for example.

According to Patent Literature 1, using a polymer as a material for the spacers imparts some flexibility to the spacers. However, it is not easy to ensure a sufficient thickness for the vacuum space successfully with such polymer spacers. In addition, putting spacers in the vacuum space would make the spacers more easily recognizable for the viewer, which is not beneficial from an aesthetic point of view.

CITATION LIST

Patent Literature

Patent Literature 1: U.S. Pat. No. 6,541,084 B2

SUMMARY OF INVENTION

It is therefore an object of the present invention to provide a glass panel unit and glass window allowing a vacuum space to be created with good stability while making the spacer much less easily recognizable to the viewer.

A glass panel unit according to an aspect of the present invention includes: a first panel including at least a first glass plate; a second panel arranged to face the first panel and including at least a second glass plate; a frame member formed in a shape of a frame, corresponding in shape to respective peripheral portions of the first panel and the second panel extending along edges thereof, and bonded to the peripheral portions; and at least one spacer provided in a vacuum space between the first panel and the second panel. The at least one spacer containing a polyimide, where the polyimide has an absorption edge at which an absorption index decreases in an optical absorption spectrum ranging from an ultraviolet ray to visible radiation, the absorption edge being equal to or less than 400 nm, and the polyimide includes at least one selected from the group consisting of a fluorine group and a chlorine group.

A glass window according to another aspect of the present invention includes: the glass panel unit; and a window frame fitted to outside of a peripheral portion of the glass panel unit extending along edges thereof.

These aspects of the present invention allow a vacuum space to be created with good stability and make the spacer much less easily recognizable to the viewer.

DESCRIPTION OF EMBODIMENTS

The following embodiments relate to glass panel units and glass windows, and more particularly relate to a glass panel unit having a vacuum space between a pair of glass plates and a glass window including the glass panel unit.

First Embodiment

Figure 1A:
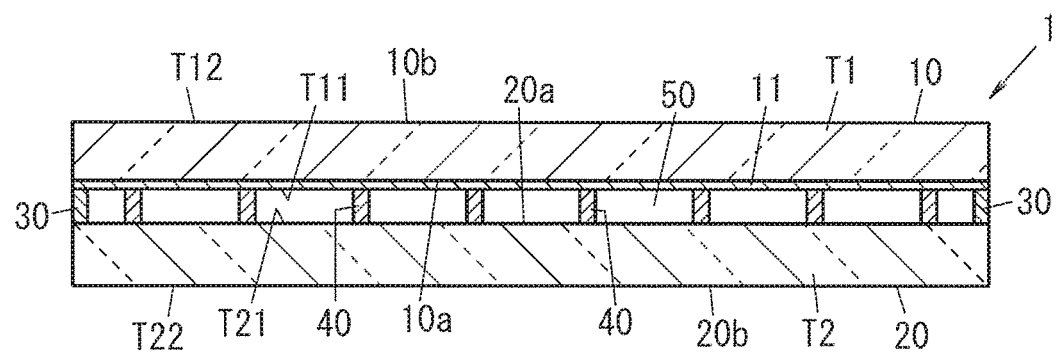
FIG. 1A is a cross-sectional view illustrating an exemplary glass panel unit according to a first embodiment of the present invention.
Figure 1B:
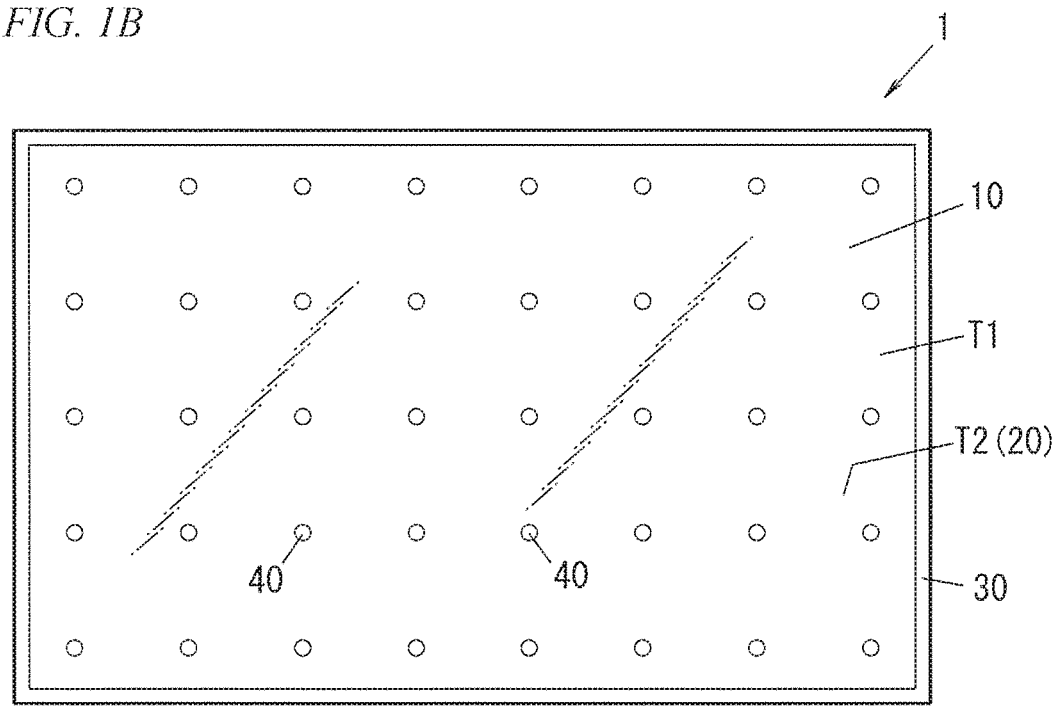
FIG. 1B is a plan view of the exemplary glass panel unit.

FIGS. 1A and 1B illustrate an exemplary glass panel unit (hereinafter referred to as a "glass panel unit 1"). The glass panel unit 1 is schematically illustrated in FIGS. 1A and 1B. Particularly in a glass panel unit 1 such as the one illustrated in FIG. 1A, the dimensions of respective portions thereof are not necessarily to scale and may be different from actual ones. For example, the thickness of the glass panel unit 1 is illustrated to be larger than the actual one to facilitate the reader's understanding. In addition, the spacers 40 are also illustrated in a larger size than actual ones. In this drawing, FIG. 1A illustrates a cross-sectional view of an exemplary glass panel unit 1, while FIG. 1B illustrates a plan view of the exemplary glass panel unit 1.

The glass panel unit 1 is basically transparent, and therefore, members inside of the glass panel unit 1 (such as the frame member 30 and the spacers 40) may be visible through the glass panel unit 1. FIG. 1B illustrates those internal members seen through the glass panel unit 1. More specifically, FIG. 1B is a plan view of the glass panel unit 1 seen through a first glass plate 10 thereof.

A glass panel unit 1 according to this embodiment includes: a first panel T1 including at least a first glass plate 10; a second panel T2 arranged to face the first panel T1 and including at least a second glass plate 20; a frame member 30 formed in the shape of a frame corresponding in shape to respective peripheral portions of the first panel T1 and the second panel T2 extending along edges thereof and bonded to the peripheral portions; and spacers 40 provided in a vacuum space 50 between the first panel T1 and the second panel T2. The spacers 40 contain a polyimide. The polyimide has an absorption edge at which an absorption index decreases in an optical absorption spectrum ranging from an ultraviolet ray to visible radiation. The absorption edge (as indicated by E1 in FIG. 2, for example) is equal to or less than 400 nm.

As shown in FIG. 1B, the spacers 40 and the vacuum space 50 are provided inside the frame member 30 in a plan view.

In the glass panel unit 1 according to this embodiment, the spacer(s) 40 contains a polyimide, thus allowing the vacuum space 50 to be created with stability. This is because the polyimide has heat resistance that is high enough to allow the glass panel unit 1 to maintain its shape even at elevated temperatures during the manufacturing process of the glass panel unit 1. In addition, the polyimide is a polymer strong enough to bear the force applied in such a direction in which the two glass plates are brought close to each other and to leave a space between these two glass plates. Furthermore, the polyimide is a resin and has more flexibility than a metal. Thus, the polyimide contributes to increasing the impact resistance of the glass panel unit 1 by absorbing the force applied to the glass plates. Moreover, the spacers 40 containing a polyimide are made of a resin and have a lower thermal conductivity than metallic spacers, and therefore, contribute to increasing the thermal insulation properties of the glass panel unit 1. What is more, a polyimide, having an absorption edge of equal to or less than 400 nm in its optical absorption spectrum, is able to transmit light falling within the visible radiation range (e.g., within a wavelength range of 400-800 nm). Thus, the spacers 40 become transparent in color, and are much less easily externally recognizable to the viewer. Although the polyimide is a polymer to be colored (in brown, for example) relatively easily, the color will be less easily recognizable, as the absorption of light decreases in the visible radiation range. Such a glass panel unit 1 will not only have its appearance improved by much less easily recognizable spacers 40, but also allow the viewer to view a target object much more easily through the glass panel unit 1 (e.g., when the viewer is looking through a window or the glass of a showcase). For example, applying the glass panel unit 1 to a showcase with a front panel of glass (such as a refrigerator) allows the viewer to view an object inside the showcase more easily.

The first panel T1 has a first surface T11 and a second surface T12. The first surface T11 is a surface in contact with the spacers 40, and the second surface T12 is an outer surface opposite from the first surface T11. The second panel T2 also has a first surface T21 and a second surface T22. The first surface T21 is a surface in contact with the spacers 40, and the second surface T22 is an outer surface opposite from the first surface T21. The first surface T11 faces the first surface T21 with the spacers 40 and the vacuum space 50 interposed between them. Meanwhile, in the first glass plate 10, the inner surface thereof is defined to be a first surface 10a, and the outer surface thereof is defined to be a second surface 10b. Likewise, in the second glass plate 20, the inner surface thereof is defined to be a first surface 20a, and the outer surface thereof is defined to be a second surface 20b. The first surface 10a of the first glass plate 10 and the first surface 20a of the second glass plate 20 face each other. In the example illustrated in FIG. 1A, the second surface 10b of the first glass plate 10 and the second surface 20b of the second glass plate 20 are exposed. In this case, the second surface 10b agrees with the second surface T12 of the first panel T1, and the second surface 20b agrees with the second surface T22 of the second panel T2. Such a glass panel unit 1 with the exposed second surfaces 10b, 20b may hereinafter referred to as a "vacuum glass panel unit".

The first glass plate 10 and the second glass plate 20 may have a thickness of 1-10 mm, for example. In this embodiment, the first glass plate 10 may be as thick as the second glass plate 20, which would facilitate the manufacturing process because the same glass plate may be used when the first glass plate 10 is as thick as the second glass plate 20.

As shown in FIG. 1B, the first panel T1 and the second panel T2 have a rectangular shape. In this case, the first glass plate 10 and the second glass plate 20 also have a rectangular shape, and therefore, the glass panel unit 1 is rectangular overall. When viewed in plan, the first panel T1 and the second panel T2 have their outer edges aligned with each other. As used herein, viewing the glass panel unit 1 in plan means viewing the glass panel unit 1 in the thickness direction thereof.

Examples of materials for the first glass plate 10 of the first panel T1 include soda lime glass, high strain point glass, chemically strengthened glass, no-alkali glass, quartz glass, Neoceram, and physically strengthened glass.

Examples of materials for the second glass plate 20 of the second panel T2 also include soda lime glass, high strain point glass, chemically strengthened glass, no-alkali glass, quartz glass, Neoceram, and physically strengthened glass.

The first glass plate 10 and the second glass plate 20 may be made of the same material. However, this is only an example and should not be construed as limiting. Alternatively, the first glass plate 10 may also be made of a different material from that of the second glass plate 20, as long as the spacers 40 are less easily recognizable.

The vacuum space 50 is sealed hermetically by the first panel T1, the second panel T2, and the frame member 30. The frame member 30 is arranged continuously on the peripheral portion of the glass panel unit 1 extending along the edges thereof. Such a frame member 30 may serve as a sealer. The vacuum space 50 may have a vacuum degree equal to or less than a predetermined value: The predetermined degree of vacuum may be 0.01 Pa, for example. The vacuum space 50 may be created by exhausting the air between the first panel T1 and the second panel T2. The vacuum space 50 may have a thickness of 10-1000 µm, for example.

Optionally, the glass panel unit 1 may include a gas adsorbent in the vacuum space 50. The gas adsorbent may include a getter. The gas adsorbent adsorbs the gas in the vacuum space 50, thus maintaining a sufficient degree of vacuum in the vacuum space 50 and improving the thermal insulation properties. The gas adsorbent may be provided for at least one site selected from the group consisting of the first surface T11 of the first panel T1, the first surface T21 of the second panel T2, the inner periphery of the frame member 30, and inside the spacers 40. The gas adsorbent may be composed essentially of a getter.

The frame member 30 may be made of a glass adhesive. That is to say, the frame member 30 may be a cured product of a glass adhesive. Examples of the glass adhesive include hot melt glass, which is also called "low-melting glass." The glass adhesive may be a glass frit including hot melt glass. Examples of the glass frits include a bismuth-based glass frit (i.e., a glass frit including bismuth), a lead-based glass frit (i.e., a glass frit including lead), and a vanadium-based glass frit (i.e., a glass fit including vanadium). These are examples of low-melting glass. Using the low-melting glass allows for reducing the thermal damage to be done on the spacers 40 during the manufacturing process of the glass panel unit 1.

The frame member 30 is arranged in the peripheral portion of the glass panel unit 1 extending along the edges thereof. That is to say, the frame member 30 is bonded to the respective peripheral portions of the first panel T1 and the second panel T2. The frame member 30 creates a space between the first panel T1 and the second panel T2. Bonding the frame member 30 to the respective peripheral portions of the first panel T1 and the second panel T2 allows for maintaining the vacuum space 50 of the glass panel unit 1.

The first panel T1 may include a thermal reflective film 11 in addition to the first glass plate 10. In this case, the thermal reflective film 11 is provided on the inner surface (i.e., the first surface 10a) of the first glass plate 10. Providing the thermal reflective film 11 on the first glass plate 10 reduces the heat conduction in the thickness direction of the glass panel unit 1, thus further improving the thermal insulation properties.

The thermal reflective film 11 may be implemented as an infrared reflective film, for example. The infrared reflective film is able to cut off infrared rays entering the vacuum space 50, thus improving the thermal insulation properties of the glass panel unit 1. The thermal reflective film 11 may be a low-E film. Optionally, the thermal reflective film 11 may have heat-shield properties. The thermal reflective film 11 may be implemented as a metallic thin film, for example. The metallic thin film is suitably formed to be thin enough to transmit incoming light and hardly affect the transparency of the glass panel unit 1.

The thermal reflective film 11 separates the vacuum space 50 from the first glass plate 10 so that the vacuum space 50 and the first glass plate 10 are not directly in contact with each other. The thermal reflective film 11 is provided over the entire first surface 10a of the first glass plate 10. Optionally, the glass panel unit 1 may include another thermal reflective film, which is similar to the thermal reflective film 11, on the first surface 20a of the second glass plate 20. Alternatively, the second panel T2 may have no thermal reflective films. That is to say, the second panel T2 may consist of the second glass plate 20 alone. In that case, the first surface 20a may agree with the first surface T21 of the second panel T2.

When the glass panel unit 1 is applied to a building, for example, the first glass plate 10 may be arranged outdoors and the second glass plate 20 may be arranged indoors. In that case, the glass panel unit 1 is installed in the building such that the first glass plate 10 is arranged outside the building and the second glass plate 20 is arranged inside the building. Naturally, these glass plates may be arranged reversely, i.e., so that the first glass plate 10 is arranged indoors and the second glass plate 20 is arranged outdoors. The glass panel unit 1 may be used in, for example, glass windows, partitions, signage panels, and showcases (such as refrigerating showcases and food warming showcases).

If the glass panel unit 1 is applied to a glass window, the glass window may include the glass panel unit 1 and a window frame fitted to outside of the peripheral portion of the glass panel unit 1 extending along the edges thereof. In such a glass window, the second surface T12 of the first panel T1 may be exposed outdoors. In that case, an infrared ray incident in the thickness direction will be cut off more easily at least by the vacuum space 50. Also, if the first panel T1 includes not only the first glass plate 10 but also the thermal reflective film 11 as described above, such an infrared ray incident in the thickness direction will be cut off even more easily.

The glass panel unit 1 includes a plurality of spacers 40. Those spacers 40 maintain a gap between the first panel T1 and the second panel T2, thus creating the vacuum space 50 easily.

The spacers 40 are arranged in the vacuum space 50. The spacers 40 are in contact with the first surface T11 of the first panel T1. That is to say, the spacers 40 are in contact with the thermal reflective film 11 provided on the first surface 10a of the first glass plate 10. The spacers 40 are also in contact with the first surface T21 of the second panel T2. If the second panel T2 consists of the second glass plate 20 alone, then the spacers 40 are in contact with the first surface 20a of the second glass plate 20. In this embodiment, the spacers 40 are columnar. The spacers 40 may have a diameter of 0.1-10 mm, for example. The smaller the diameter of the spacers 40 is, the less recognizable the spacers 40 be. On the other hand, the larger the diameter of the spacers 40 is, the stronger the spacers 40 will be. The spacers 40 may have a height of 10-1000 µm, for example. The height of the spacers 40 defines the gap between the first panel T1 and the second panel T2, i.e., the thickness of the vacuum space 50.

Those spacers 40 are arranged at respective intersections of a virtual rectangular grid (see FIG. 1B). The spacers 40 may be arranged at a pitch of 10-100 mm, for example. Specifically, this pitch may be 20 mm. The shape, size, number, pitch, and arrangement pattern of the spacers 40 are not particularly limited but may be selected appropriately. For example, the spacers 40 may have a prismatic shape or spherical shape.

In the glass panel unit 1, the spacers 40 are made of a resin. The spacers 40 contain a polyimide, which allows the spacers 40 to have high heat resistance and high strength. The resin spacers 40 are given some pressing force by the first panel T1 and the second panel T2 when the glass panel unit 1 is completed, and therefore, tend to somewhat expand in the radial direction, compared to the size before the glass panel unit 1 is completed. Nevertheless, the high strength of the polyimide contained in the spacers 40 decreases the degree of the radial expansion compared to a situation where another type of resin is used, thus making the spacers 40 less easily recognizable. In addition, the use of a polyimide with less light absorption property increases the transparency of the spacers 40. That is why even if the spacers 40 somewhat expand under the pressing force, the spacers 40 are still less easily recognizable.

The polyimide contained in the spacers 40 has an absorption edge at which an absorption index decreases in an optical absorption spectrum ranging from an ultraviolet ray to visible radiation. The absorption edge of the polyimide is equal to or less than 400 nm. In a graph, of which the abscissa indicates the wavelength and the ordinate indicates the absorption index, the optical absorption spectrum is represented by the process of variation in absorption index with respect to the variation in wavelength. As used herein, the absorption edge refers to a wavelength at which the absorption index falls steeply in an optical absorption spectrum when the wavelength increases (i.e., when the wavelength changes from a short wavelength to a long wavelength). The absorption edge is an edge of a range, representing an absorptive property of the spacers 40, of the optical absorption spectrum, so to speak. In this case, the range from an ultraviolet ray to visible radiation may be the wavelength range of 250-800 nm, for example.

The optical absorption spectra of polyimides will be described with reference to FIG. 2, which is a graph schematically showing the optical absorption spectra of polyimides. In this graph, the abscissa indicates the wavelength and the ordinate indicates the absorption index. The wavelength indicated by the abscissa means the wavelength of light (in nm). Nevertheless, an optical absorption spectrum may include a range outside of the visible radiation range (i.e., an ultraviolet range and an infrared range). Thus, exactly speaking, this wavelength means the wavelength of an electromagnetic wave. In the following description, however, the wavelength is supposed to be the wavelength of light for convenience sake. The absorption index indicated by the ordinate may be represented by a value between a minimum value of zero and a maximum value of one. When the incoming light is absorbed entirely (i.e., when the incoming light is not transmitted at all), the absorption index is equal to one.

Figure 2:
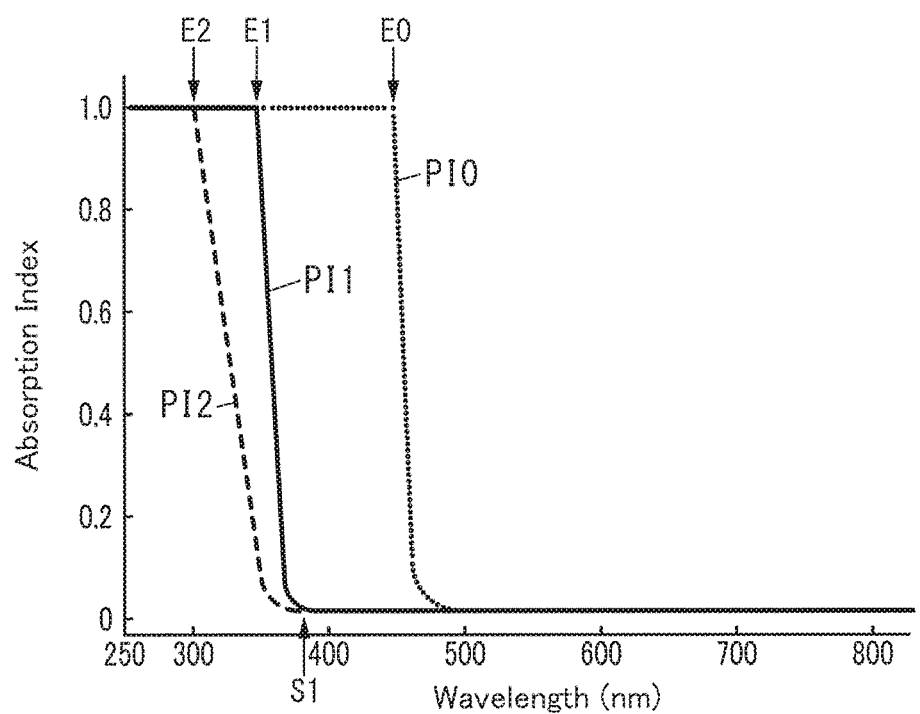
FIG. 2 is an exemplary graph schematically showing a relationship between an optical absorption spectrum of a polyimide and the wavelength of light according to the first embodiment of the present invention.

In FIG. 2, shown are the optical absorption spectra of three types of polyimides (which are designated by PI0, PI1, and PI2, respectively). As shown in FIG. 2, in an optical absorption spectrum of a polyimide, the absorption index is normally almost equal to one at short wavelengths, but steeply falls at some point (wavelength) as the wavelength increases. As a result, a spectrum with an absorption index of almost zero is obtained. That is to say, the optical absorption spectrum falls steeply stepwise from the maximum value to the minimum value.

The polyimide PI0 is an exemplary general polyimide (i.e., representing a comparative example). The general polyimide PI0 exhibits a spectrum in which the light absorption property thereof remains high at short wavelengths ranging from the ultraviolet range to the visible radiation range but decreases to almost zero at a wavelength in the middle of the visible radiation range. In the case of the polyimide PI0, the light absorption property thereof decreases steeply in the vicinity of a wavelength of 450 nm. This wavelength at which the light absorption property decreases steeply is the absorption edge. FIG. 2 shows the absorption edge E0 of the polyimide PI0. As shown in FIG. 2, the absorption edge E0 of the polyimide PI0 is greater than 400 nm. In this case, the polyimide PI0 does not transmit a part of light falling within the visible radiation range and may be colored by the light falling within the visible radiation range. In fact, a general polyimide may be colored in light brown even if it is transparent to only a small degree or a certain degree.

On the other hand, the polyimides PI1 and PI2 are exemplary polyimides having an absorption edge of less than 400 nm. As shown in FIG. 2, the absorption edge E1 of the polyimide PI1 and the absorption edge E2 of the polyimide PI2 are less than, and on the left-hand side of (i.e., shorter than), the wavelength of 400 nm. When the absorption edge of a polyimide is less than 400 nm in this manner, the polyimide is able to transmit light falling within the entire visible radiation range, and therefore, comes to have a very high degree of transparency. In fact, such a polyimide with an absorption edge of less than 400 nm is no longer colorable, unlike a normal polyimide. Thus, when light falling within the visible radiation range is transmitted through the glass panel unit 1, the spacers 40 containing a polyimide with an absorption edge of equal to or less than 400 nm will be much less easily recognizable, thus improving the appearance of the glass panel unit 1.

In an optical absorption spectrum of a polyimide, the light absorption property normally declines steeply (by a light absorption index of 0.5 or more) in the vicinity of a certain wavelength. However, the light absorption property will decline in many different ways, which vary significantly from one polyimide to another. For example, in the polyimide PI1, the absorption index falls almost perpendicularly all of a sudden at the absorption edge E1. On the other hand, in the polyimide PI2, the absorption index starts to fall at the absorption edge E2 and decreases relatively gradually (i.e., from the upper left corner toward the lower right corner) as the wavelength increases. The polyimide PI2 is a polyimide, of which the light absorption index decreases comparatively gradually. Nevertheless, even in the case of the polyimide PI2, the wavelength range in which the absorption index changes significantly from around the maximum value to around the minimum value also has a width of less than 100 nm. Thus, it can be said that the absorption index of the polyimide PI2 also decreases steeply.

In this case, in the optical absorption spectrum of a polyimide, there can be a wavelength which becomes an inflection point of a graph when the absorption index falls to reach the minimum value (and which will be hereinafter referred to as an "inflection point wavelength"). In addition, there can also be a wavelength which defines an intersection between a line representing the falling absorption index and a line passing through a point with the minimum absorption index (and which will be hereinafter referred to as an "intersection wavelength"). Furthermore, there can also be a wavelength at which the falling absorption index almost reaches a minimum value (and which will be hereinafter referred to as a "minimum starting wavelength"). It is recommended that at least one of these wavelengths be equal to or less than 400 nm, which would further increase the light transmission properties of the polyimide. In other words, the inflection point wavelength is suitably equal to or less than 400 nm. Likewise, the intersection wavelength is also suitably equal to or less than 400 nm. The minimum starting wavelength is suitably equal to or less than 400 nm as well. In FIG. 2, the minimum starting wavelength S1 of the polyimide PI1 is shown as an exemplary minimum starting wavelength. In this graph, the minimum starting wavelength of the polyimide PI2 is also approximately equal to the minimum starting wavelength S1 of the polyimide PI1. The inflection point wavelength and the intersection wavelength are present between the absorption edge and the minimum starting wavelength. Note that in an actual polyimide, the optical absorption spectrum may include a waveshape graph, thus possibly deforming the shape of the graph. In that case, these wavelengths may be obtained by an approximation graph (or an approximation curve). Also, as used herein, "when the absorption index almost reaches a minimum value", it means that the difference between a given absorption index and a minimum absorption index in the range of 250-800 nm is equal to or less than 0.05, suitably equal to or less than 0.03.

Polyimides applicable to the spacers 40 will be further described. The polyimide is generally a polymer containing a structure represented by the following Formula (1):

[Formula 1]

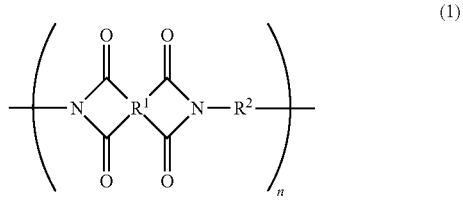

(1)

In Formula 1, $R^1$ and $R^2$ indicate organic groups independently of each other and n indicates an integer equal to or greater than one.

In this case, a polyimide in which an aromatic compound structure is introduced into both of $R^1$ and $R^2$ in Formula (1) will be hereinafter referred to as an "aromatic polyimide". In an aromatic polyimide, $R^1$ and $R^2$ both contain an aromatic ring. Most of polyimides currently used on an industrial basis are aromatic polyimides. That is to say, the general polyimide is an aromatic polyimide, which tends to exhibit light absorption properties similar to those of the polyimide PI0 shown in FIG. 2. That is why spacers made of an aromatic polyimide tend to be easily externally recognizable to the viewer. Thus, allowing the polyimide to have a different chemical structure from a general one (i.e., the structure of a general aromatic polyimide) makes the absorption edge of the polyimide equal to or less than 400 nm and improves the light transmission properties of the spacers 40.

In an exemplary embodiment, the polyimide suitably contains an alicyclic structure. A polyimide with an alicyclic structure tends to have an absorption edge of 400 nm or less in an optical absorption spectrum. It is recommended that in the polyimide represented by Formula (1), either $R^1$ or $R^2$, or both of $R^1$ and $R^2$, contains an alicyclic structure. The alicyclic structure is introduced into the polymer backbone of the polyimide. It is beneficial that either $R^1$ or $R^2$ contains no aromatic rings or neither $R^1$ nor $R^2$ contains any aromatic rings. The smaller the amount of the aromatic rings is, the more transparent the polyimide will be. This is because an aromatic ring contains a conjugated double bond, which often causes coloring.

The alicyclic structure contains a structure in which hydrocarbons are connected together in a ring form. The alicyclic structure is suitably a cycloalkane structure. Examples of the cycloalkane structures include structures such as cyclopropane, cyclobutane, cyclopentane, cyclohexane, cycloheptane, cyclooctane, cyclononane, cyclodecane, cycloundecane, and cyclododecane. The alicyclic structure may also be a cycloalkene structure. Examples of the cycloalkene structures include structures such as cyclopropene, cyclobutene, cyclopentene, cyclohexene, cycloheptene, and cyclooctene. The alicyclic structure may also be a bicyclic alkane, a bicyclic alkene, a structure derived from a polycyclic compound, or a structure derived from a spiro compound, for example. Examples of these include a norbornane structure. In any case, however, the alicyclic structure is suitably composed of saturated hydrocarbons (with no unsaturated bonds). This is because unsaturated bonds (including double bonds and triple bonds) could cause light absorption. An appropriate polyimide having an alicyclic structure may be selected with its optical properties and heat resistance taken into account. As the number of aromatic rings decreases, the light absorption property declines, and the heat resistance tends to decline as well.

In an exemplary embodiment, a polyimide contains at least one of a fluorine group or a chlorine group (i.e., at least one selected from the group consisting of a fluorine group and a chlorine group). Such a polyimide containing a fluorine group or a chlorine group tends to have an absorption edge of equal to or less than 400 nm in the optical absorption spectrum. In the polyimide represented by Formula (1), either $R^1$ or $R^2$, or both of $R^1$ and $R^2$, contain at least one of a fluorine group or a chlorine group. At least one of a fluorine group (F) or a chlorine group (Cl) is introduced to a carbon atom in the polyimide, to be bonded to the carbon atom in the polyimide. Alternatively, at least one of a fluorine group or a chlorine group may be introduced into an aromatic polyimide. That is to say, either $R^1$ or $R^2$, or both of $R^1$ and $R^2$, may contains an aromatic ring. The polyimide to which a fluorine group or a chlorine group has been introduced has an increased degree of transparency. Although a general aromatic polyimide is colored, such a polyimide to which a fluorine group or a chlorine group has been introduced is colorless. It is recommended that the polyimide contain a fluorine group, among other things. This is because a polyimide with a fluorine group is available more easily than a polyimide with a chlorine group. Such a polyimide to which a fluorine group has been introduced may be called a "polyimide fluoride." Such a polyimide to which a chlorine group has been introduced may be called a "polyimide chloride." Optionally, the polyimide may even be a polyimide to which both a fluorine group and a chlorine group have been introduced. Alternatively, the polyimide may contain an alicyclic structure and may contain at least one of a fluorine group or a chlorine group. Introduction of a fluorine group would weaken electron coupling and therefore would increase the degree of transparency of the polyimide. In the case of a chlorine group, introduction of a bulky chlorine group would destroy the planarity of the molecule and weaken the electron coupling, thus possibly increasing the degree of transparency of the polyimide.

The following are some specific examples of polyimides. The structures of the following chemical formulae (in brackets) represent constitutional units of the polyimides. Each polyimide contains a chemical structure in which a number of such constitutional units are linked together repeatedly.

[Formula 2]

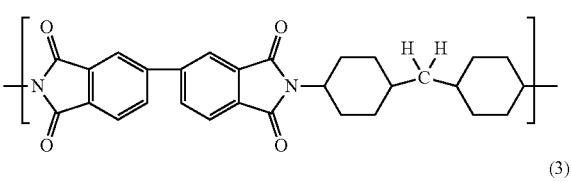

(2)

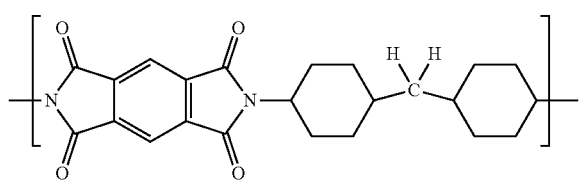

(3)

-continued

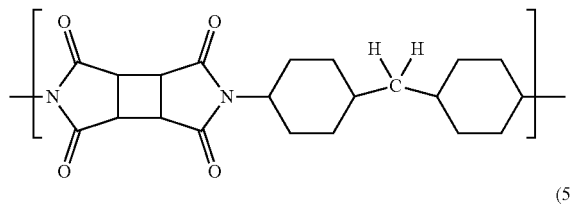

(4)

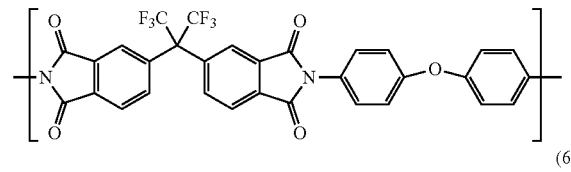

(5)

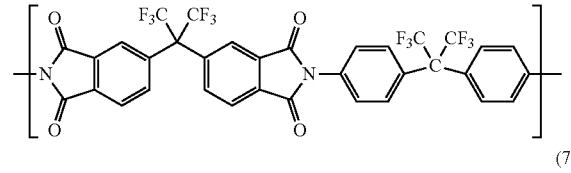

(6)

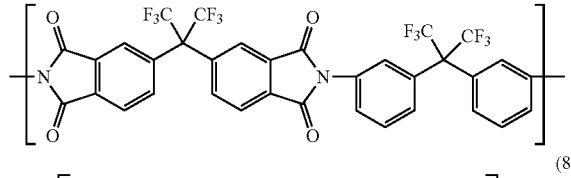

(7)

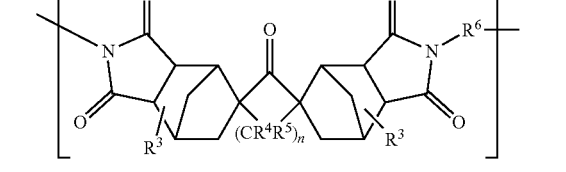

(8)

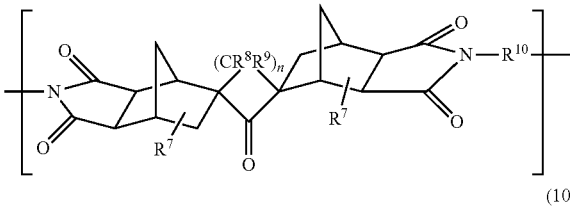

(9)

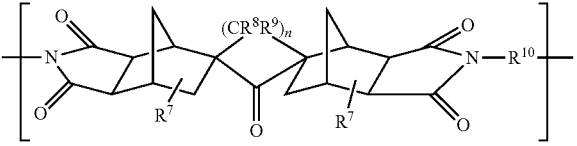

(10)

Formulae (2)-(4) represent exemplary polyimides each containing an alicyclic structure. The polyimides represented by Formulae (2) and (3) are examples in which $R^2$ in Formula (1) contains an alicyclic structure. In these polyimides, $R^2$ contains no aromatic rings. The alicyclic structure is a cyclohexane structure which is a 6-membered ring structure of saturated hydrocarbons. There are two cyclohexane structures. Such a polyimide in which one of $R^1$ or $R^2$ contains an alicyclic structure is called a "semi-alicyclic polyimide". Meanwhile, a polyimide in which one of $R^1$ or $R^2$ contains at least one aromatic ring and the other contains no aromatic rings is called a "semi-aromatic polyimide."

The polyimide represented by Formula (4) is an example in which $R^1$ and $R^2$ of Formula (1) each contain an alicyclic structure. In this polyimide, neither $R^1$ nor $R^2$ contains any aromatic rings. The alicyclic structure contained in $R^1$ is a cyclobutane structure, which is a 4-membered ring structure of saturated hydrocarbons. Each alicyclic structure contained in $R^2$ is a cyclohexane structure, which is a 6-membered ring structure of saturated hydrocarbons. There is one cyclobutane structure and there are two cyclohexane structures. Such a polyimide in which $R^1$ and $R^2$ each contain an alicyclic structure is called a "fully alicyclic polyimide." Such a fully alicyclic polyimide may contain a structure with no aromatic rings.

Formulae (5)-(7) represent exemplary polyimides each containing a fluorine group. The polyimide represented by Formula (5) is an example in which $R^1$ of Formula (1) contains a fluorine group. The polyimides represented by Formulae (6) and (7) are examples in which $R^1$ and $R^2$ of Formula (1) each contain a fluorine group. In Formulae (5)-(7), a trifluoromethyl group is introduced into the polyimide. The trifluoromethyl group is bonded to a carbon atom between two aromatic rings. In Formulae (5)-(7), an aromatic polyimide has been fluorinated. These may be called "fluorine-containing aromatic polyimides". In a variation, the fluorine groups may be bonded to an aromatic ring contained in a polyimide. For example, in that case, the polyimide may contain a benzene ring to which the fluorine group(s) is bonded. However, as represented by Formula (5)-(7), the structure in which any trifluoromethyl group is bonded to a carbon atom, other than a carbon atom of an aromatic ring, is more beneficial than such a variation. This would increase the degree of transparency of the polyimide more easily. Examples of polyimides containing a chlorine group include polyimides in which a chlorine group is substituted for the fluorine groups in Formulae (5)-(7).

A polyimide is obtained by polycondensation of a diamine and a tetracarboxylic anhydride. $R^1$ of Formula (1) derives from a tetracarboxylic anhydride. $R^2$ of Formula (1) derives from a diamine. A polyimide obtained by a reaction between an aromatic diamine and an aromatic tetracarboxylic anhydride is an aromatic polyimide. Therefore, in an exemplary embodiment, if the polyimide contains an alicyclic structure, at least one of the diamine or the tetracarboxylic anhydride, used as a material for the polyimide, suitably contains at least one alicyclic structure. A semi-alicyclic polyimide is obtained by a reaction between a diamine containing an alicyclic structure; and an aromatic tetracarboxylic anhydride. A semi-alicyclic polyimide is also obtained by a reaction between an aromatic diamine and a tetracarboxylic anhydride containing an alicyclic structure. A fully alicyclic polyimide is obtained by a reaction between a diamine containing an alicyclic structure; and a tetracarboxylic anhydride containing an alicyclic structure.

In an exemplary embodiment, if the polyimide contains at least one of a fluorine group or a chlorine group, at least one of the diamine or the tetracarboxylic anhydride, used as a material for the polyimide, suitably contains at least one of the fluorine group or the chlorine group. If the material for the polyimide contains the fluorine group, then a fluorine-containing polyimide may be obtained by polycondensation of the material.

Alternatively, the fluorine-containing polyimide may also be obtained by introducing a fluorine group into (i.e., by fluorinating) the polyimide obtained by polycondensation of a diamine and a tetracarboxylic anhydride. The fluorine group may also be introduced by, for example, fluoridation, fluorine substitution, or addition of a fluorine compound. For example, a trifluoromethyl group containing polyimide may be obtained by introducing a trifluoromethyl group into the polyimide.

In these examples, the polyimide represented by Formula (2) is called "BPDA/DCHM", the polyimide represented by Formula (3) is called "PMDA/DCHM," and the polyimide represented by Formula (4) is called "CBDA/DCHM." Each of these notations indicates that it is obtained by a reaction between a tetracarboxylic anhydride, which is the compound before the "/" sign, and a diamine, which is the compound after the "/" sign. BPDA stands for 3,3',4,4'-biphenyltetracarboxylic acid anhydride. PMDA stands for pyromellitic anhydride. CBDA stands for 1,2,3,4-cyclobutane tetracarboxylic dianhydride. DCHM stands for 4,4'-diaminodicyclohexyl methane.

In Formulae (5) and (6), the portion corresponding to $R^1$ of Formula (1) is the same and is called "6FDA." This portion derives from a tetracarboxylic anhydride named 2,2-bis(3,4-anhydrodicarboxyphenyl) hexafluoropropane (also known as "6FDA"). 6FDA is beneficially contained in the polyimide, because 6FDA tends to make the polyimide colorless and transparent.

The following are suitable examples (compounds) of the tetracarboxylic dianhydride used as a material for the polyimide. Those compounds will be hereinafter referred to as Compounds (a1)-(a4), which are tetracarboxylic dianhydrides containing an alicyclic structure.

[Formula 3]

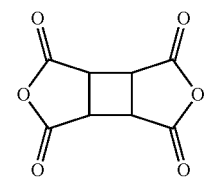
(a1)

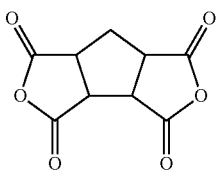
(a2)

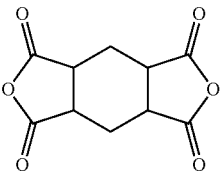
(a3)

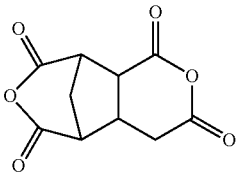
(a4)

From the tetracarboxylic dianhydride, obtained are polyimides in which $R^1$ of Formula (1) contains at least one of the structures enclosed in the dashed rectangles (hereinafter referred to as "Structures (A1)-(A4)"). Such a polyimide containing, as $R^1$ of Formula (1), at least one selected from Structures (A1)-(A4) is suitable for the spacers 40, because Structures (A1)-(A4) each contain an alicyclic structure.

[Formula 4]

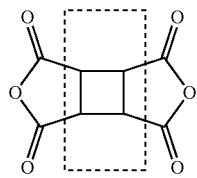
(A1)

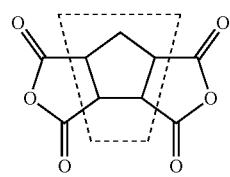
(A2)

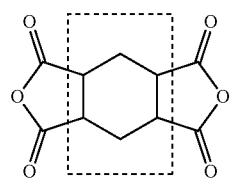
(A3)

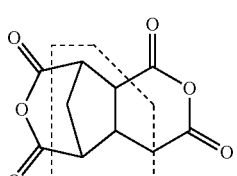
(A4)

The following are suitable examples (compounds) of a diamine as a material for the polyimide. Those compounds will be hereinafter referred to as Compounds (b1)-(b6). Specifically, Compounds (b1), (b2), and (b4) are diamines each containing an alicyclic structure. Compound (b5) is a diamine containing a fluorine group. Compound (b6) is a diamine containing a chlorine group. Compound (b3) is a diamine containing an alicyclic structure and a fluorine group. Note that the aminomethyl group on the left of Compound (b4) is bonded to a cyclopentane ring or a cyclohexane ring.

[Formula 5]

(b1)

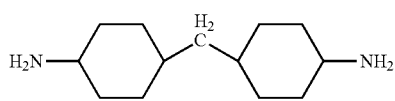
(b2)

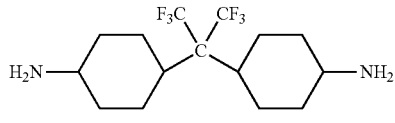
(b3)

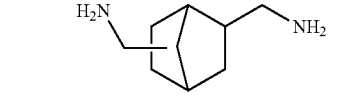
(b4)

-continued

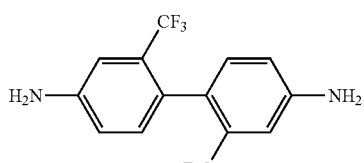
(b5)

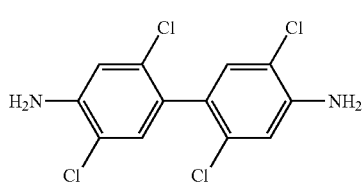
(b6)

From the diamine, obtained are polyimides in which $R^2$ of Formula (1) contains at least one of the structures enclosed in the dashed rectangles (hereinafter referred to as "Structures (B1)-(B6)"). Such a polyimide containing, as $R^2$ of Formula (1), at least one selected from Structures (B1)-(B6) is suitable for the spacers 40. This is because Structures (B1), (B2), and (B4) each contain an alicyclic structure, Structure (B5) contains a fluorine group, Structure (B6) contains a chlorine group, and Structure (B3) contains an alicyclic structure and a fluorine group. Note that the aminomethyl group on the left of Structure (B4) is bonded to a cyclopentane ring or a cyclohexane ring.

[Formula 6]

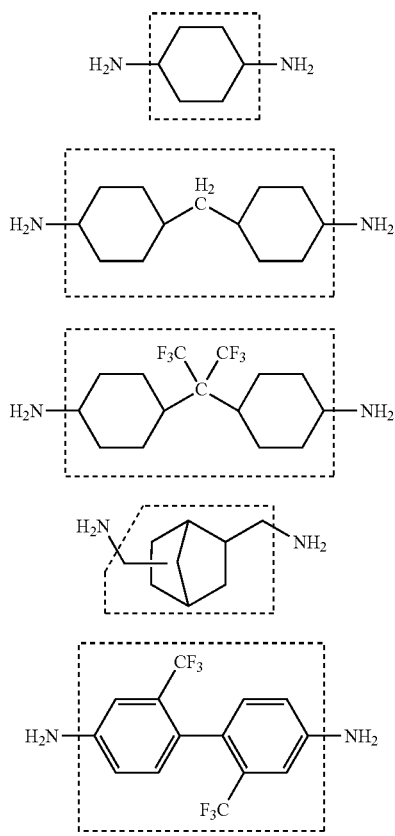

-continued

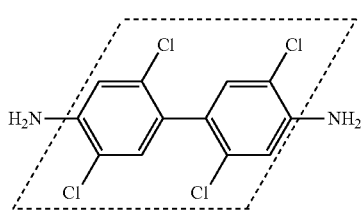
(B6)

The polyimide represented by Formula (8) is an example in which $R^1$ of Formula (1) contains an alicyclic structure. In Formula (8), $R^3$, $R^4$, and $R^5$ indicate one selected from the group consisting of a hydrogen atom, an alkyl group with a carbon number of 1-10, and a fluorine atom independently of each other, $R^6$ indicates an aryl group with a carbon number of 6-40, and n indicates an integer of 0-12.

If an alkyl group is adopted as $R^3$, $R^4$, or $R^5$ in Formula (8), the alkyl group may be either a straight-chain alkyl group or a branched-chain alkyl group. Examples of the alkyl groups include a methyl group, an ethyl group, an n-propyl group, and an isopropyl group. Among other things, the alkyl group is suitably a methyl group or an ethyl group. More suitably, the alkyl group is a methyl group.

The polyimide represented by each of Formulae (9) and (10) is an exemplary polyimide in which $R^1$ of Formula (1) contains an alicyclic structure. In Formulae (9) and (10), $R^7$, $R^8$, and $R^9$ indicate a hydrogen atom, an alkyl group with a carbon number of 1-10, or a fluorine atom independently of each other, $R^{10}$ indicates an aryl group with a carbon number of 6-40, and n indicates an integer of 0-12.

If an alkyl group is adopted as $R^7$, $R^8$, or $R^9$ in Formulae (9) and (10), the alkyl group may be either a straight-chain alkyl group or a branched-chain alkyl group. Examples of the alkyl groups include a methyl group, an ethyl group, an n-propyl group, and an isopropyl group. Among other things, the alkyl group is suitably a methyl group or an ethyl group. More suitably, the alkyl group is a methyl group.

$R^6$ in Formula (8) or $R^{10}$ in Formulae (9) and (10) is an aryl group with a carbon number of 6-40 as described above. The aryl group may be one type of group represented by the formula selected from the group consisting of the following Formulae (11)-(14):

[Formula 7]

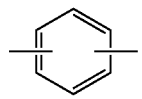
(11)

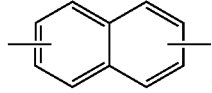
(12)

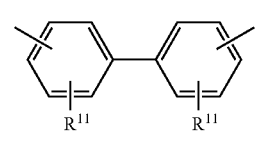
(13)

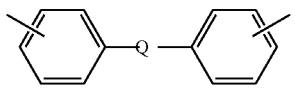
(14)

$R^{11}$ in Formula (13) may be one type of group selected from the group consisting of a hydrogen atom, a fluorine atom, a methyl group, an ethyl group, and trifluoromethyl group. Q in Formula (14) is suitably a group represented by the formula: —O—, —S—, —CO—, —CONH—, —C$_6$H$_4$—, —COO—, —SO$_2$—, —C(CF$_3$)$_2$—, —C(CH$_3$)$_2$—, —CH$_2$—, —O—C$_6$H$_4$—C(CH$_3$)$_2$—C$_6$H$_4$—O—, —O—C$_6$H$_4$—SO$_2$—C$_6$H$_4$—O—C—C(CH$_3$)$_2$—C$_6$H$_4$—C(CH$_3$)$_2$—, —O—C$_6$H$_4$—C$_6$H$_4$—O—, or —O—C$_6$H$_4$—O—.

$R^{11}$ in Formula (13) is more suitably a hydrogen atom, a fluorine atom, a methyl group or an ethyl group, and is particularly suitably a hydrogen atom.

Q in Formula (14) is suitably a group represented by the formula: —O—, —S—CONH—, —COO—, —CO—, —C$_6$H$_4$—, —CH$_2$—, or —O—C$_6$H$_4$—O—. Q is more suitably a group represented by the formula: —O—, —CONH—, —COO—, or —CH$_2$—. Among other things, Q is particularly suitably a group represented by the formula —O— or —CONH—.

Among the groups adopted as $R^6$ or $R^{10}$ and represented by Formulae (11)-(14), $R^6$ is more suitably a group represented by either Formula (13) or Formula (14), and $R^{10}$ is more suitably a group represented by either Formula (13) or Formula (14). If either $R^6$ or $R^{10}$ is a group represented by Formula (14), their Q is suitably a group represented by —O—, —S—, —CH$_2$—, —O—C$_6$H$_4$—O—CONH—, —COO—, —CO—, or —C$_6$H$_4$—. Alternatively, $R^6$ may also be a group represented by Formula (11) or a group represented by Formula (12). Likewise, $R^{10}$ may also be a group represented by Formula (11) or a group represented by Formula (12).

In an exemplary embodiment, a polyimide is suitably obtained from a diamine with a wide bandgap and a tetracarboxylic anhydride. A wide bandgap facilitates obtaining a polyimide with high light transmission properties. The bandgap ($E_g$) represents an energy difference between HOMO and LUMO. It is recommended that a tetracarboxylic anhydride with weak electron accepting property (i.e., with a small $E_a$) and a diamine with weak electron donating property (with a large $l_p$) be used in combination. For example, $E_a$ of the tetracarboxylic anhydride is suitably less than 1 eV. Also, $l_p$ of the diamine is suitably greater than 8 eV. The difference between $E_a$ and $l_p$ is suitably greater than 5 eV, more suitably greater than 7 eV.

The absorption edge of the polyimide is suitably less than a wavelength at which the optical transmittance of the first glass plate 10 and the second glass plate 20 starts to decrease. This would reduce the degradation of the spacers 40 due to ultraviolet exposure. This is because in such a situation, the first glass plate 10 and the second glass plate 20 would transmit the incoming light (ultraviolet ray) less easily, thus reducing the percentage of the incoming ultraviolet ray impinging on the polyimide. In addition, this would also reduce a release of a gas due to the decomposition of the resin (including the polyimide) by the ultraviolet ray, thus enabling the vacuum space 50 to be maintained (suitably by keeping the degree of vacuum constant).

Figure 3:
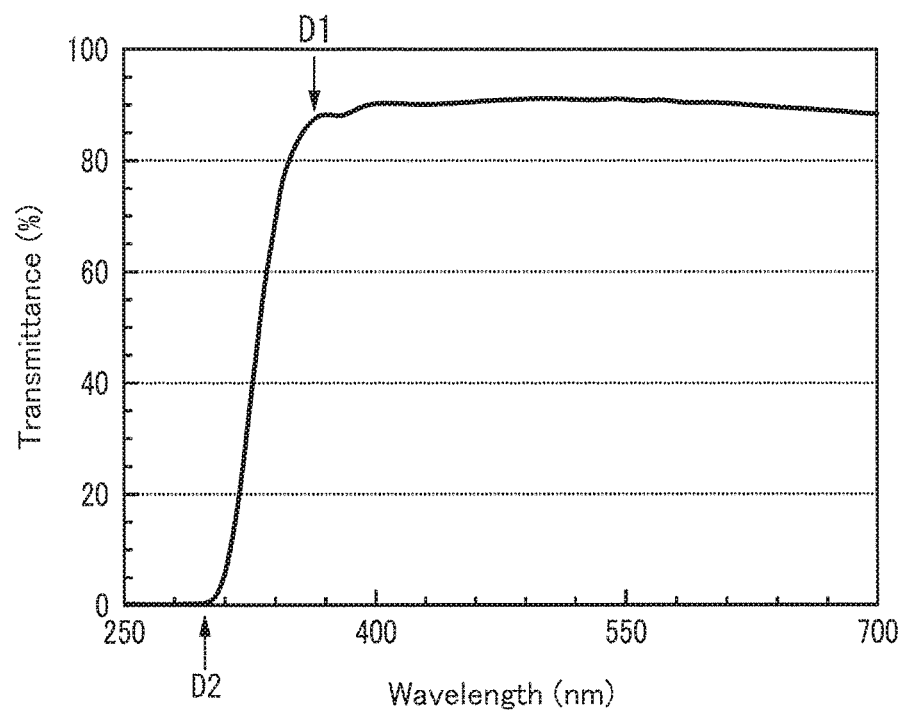
FIG. 3 is an exemplary graph schematically showing a relationship between the optical transmittance of glass and the wavelength of light according to the first embodiment of the present invention.

FIG. 3 is a graph showing a relationship between the optical transmittance of glass for use as the first glass plate 10 and the second glass plate 20 according to this embodiment and the wavelength of the incoming light. In FIG. 3, the abscissa indicates the wavelength (nm) of the incoming light, and the ordinate indicates the transmittance (%). In the example illustrated in FIG. 3, a soda glass plate is used as the glass plate. As shown in FIG. 3, the glass transmits the incoming light in the visible radiation range but comes to have a decreased transmittance in the ultraviolet range (of 380 nm or less, for example). The decrease in transmittance means that the glass is absorbing the ultraviolet ray. With this regard, the wavelength at which the optical transmittance of the glass plate starts to decrease as the wavelength of incoming light falls is termed a "transmittance falling point" (i.e., a point where the transmittance falls steeply), which is indicated by D1 in the graph of FIG. 3. If the wavelength at the absorption edge (indicated by E1 or E2 in FIG. 2) of the polyimide is shorter than the wavelength at the transmittance falling point D1, the ultraviolet ray is absorbed by the glass and less likely to strike the polyimide. The wavelength at which the optical transmittance of the glass is substantially equal to zero is defined to be a transmittance bottom point (which is indicated by D2 in FIG. 3). The absorption edge of the polyimide may be less than the transmittance bottom point D2. Also, the minimum starting wavelength (indicated by S1 in FIG. 2) of the polyimide may be shorter than the wavelength at the transmittance falling point D1 of the glass plate. Furthermore, the minimum starting wavelength (indicated by S1 in FIG. 2) of the polyimide may be shorter than the wavelength at the transmittance bottom point D2 of the glass plate.

In the known art, a metal has generally been used as a material for the spacers of a vacuum glass panel. However, a metal has too high thermal conductivity to achieve good thermal insulation properties advantageously. In addition, a metal has too poor elasticity to absorb impact effectively, thus making the vacuum glass panel more vulnerable to impact. Glass or a ceramic could be used as a material for the spacers. In that case, however, the strength would tend to decrease. Furthermore, according to another method, a resin with low thermal conductivity may be used. Nevertheless, it is difficult to select an appropriate resin in terms of strength, heat resistance, and transparency. In the glass panel unit 1 according to this embodiment, the use of the polyimide imparts high strength and excellent transparency to the spacers 40. In addition, the spacers 40 have elasticity high enough to increase the impact resistance. Furthermore, the spacers 40 are also capable of withstanding intense heat and are much less likely to collapse than known ones. Moreover, the spacers 40 have so low thermal conductivity as to exhibit significantly improved thermal insulation properties. On top of that, the high light transmission properties of the spacers 40 improve the appearance of the glass panel unit 1.

In an exemplary embodiment, the spacers 40 are suitably formed of a film, which is made of a resin. In that case, the spacers 40 suitably include at least one polyimide film. More suitably, the spacers 40 include a stack of a plurality of polyimide films. In other words, the spacers 40 may be formed of at least one polyimide film. Forming the spacers 40 of at least one polyimide film facilitates forming the spacers 40. Specifically, a polyimide film may be cut out into pieces with an appropriately shape for the glass panel unit 1. Those pieces of the polyimide film that have been cut out in this manner may be used as the spacers 40. If the spacers 40 are implemented as a stack, then the spacers 40 may be either a stack of two or more polyimide films or a stack of a polyimide film and another substance. The spacers 40 may be obtained by cutting a plurality of pieces with a predetermined size out of the polyimide film by punching, for example. The resin film may be a resin sheet, for example. That is to say, the polyimide film may be a polyimide sheet.

Figure 4:
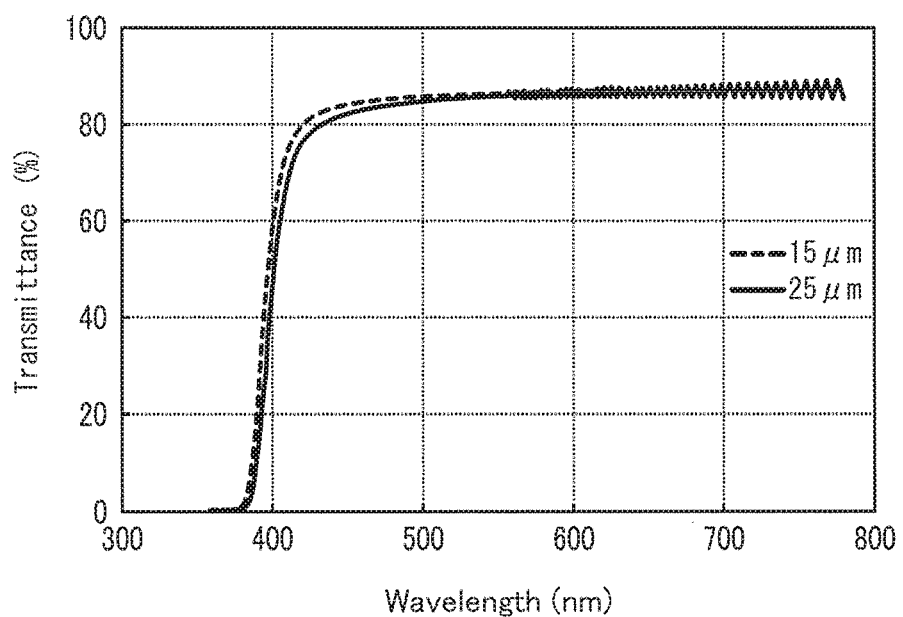
FIG. 4 is an exemplary graph showing the optical transmittance of a polyimide film according to the first embodiment of the present invention.

FIG. 4 is an exemplary graph showing a relationship between the optical transmittance of a polyimide film and the wavelength of the incoming light. The polyimide film suitably has an optical transmittance of 80% or more at a wavelength of 450-700 nm. A polyimide like this is called a "transparent polyimide film". Use of such a transparent polyimide film makes the spacers 40 much less easily recognizable. In that case, the optical transmittance of the spacers 40 can be 80% or more at wavelength of 450-700 nm. The graph illustrated in FIG. 4 shows two exemplary polyimide films with different thicknesses (namely, 15 μm and 25 μm), both of which satisfy the condition described above.

The spacers 40 may include at least one transparent polyimide film. The transparent polyimide film is a film of the polyimide with transparency as described above.

Examples of a semi-aromatic polyimide film which may be used as the spacers 40 include "NEOPRIM" produced by Mitsubishi Gas Chemical Company, Inc. Examples of an aromatic polyimide film with transparency include "TORMED" produced by I. S. T. Corporation. Note that the spacers 40 do not have to be formed of a film. For example, arranging cured pieces of a composition including either a polyimide or a material thereof between the first panel T1 and the second panel T2 allows those cured pieces to serve as the spacers 40.

An exemplary manufacturing process of the glass panel unit 1 according to this embodiment will be described.

Figure 5A:
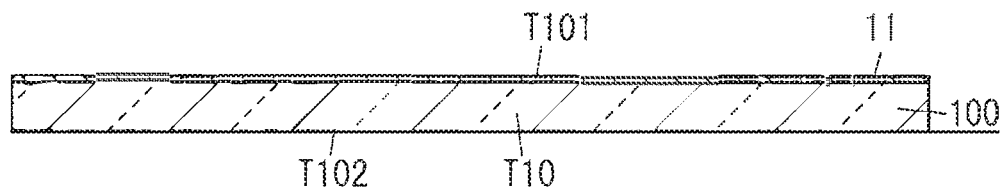
FIGS. 5A-5D illustrate an exemplary series of manufacturing process steps of a glass panel unit according to the first embodiment of the present invention, and are more specifically cross-sectional views illustrating intermediate products obtained while the glass panel unit is being formed.
Figure 5B:
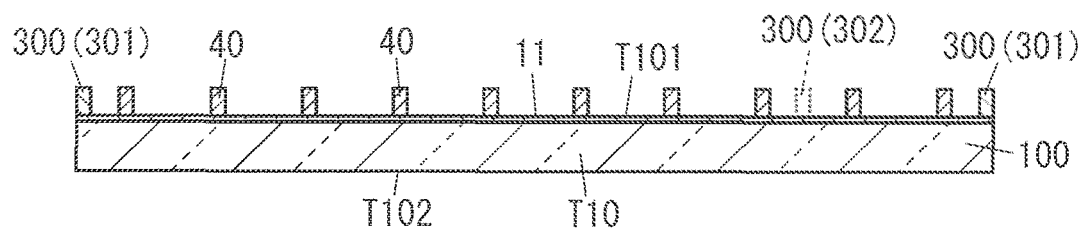
Figure 5C:
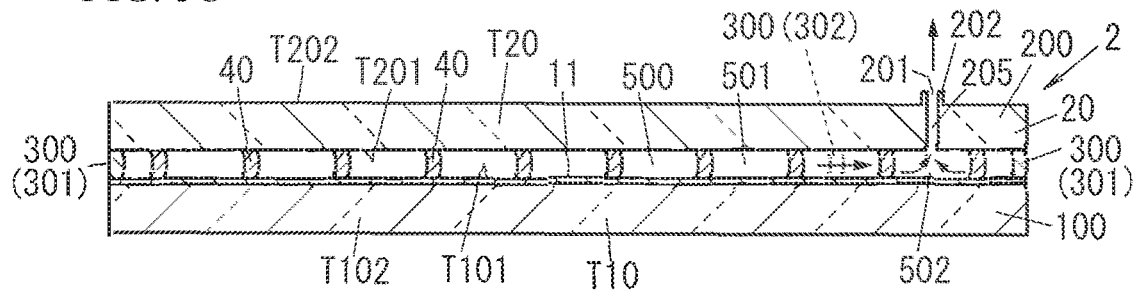
Figure 5D:
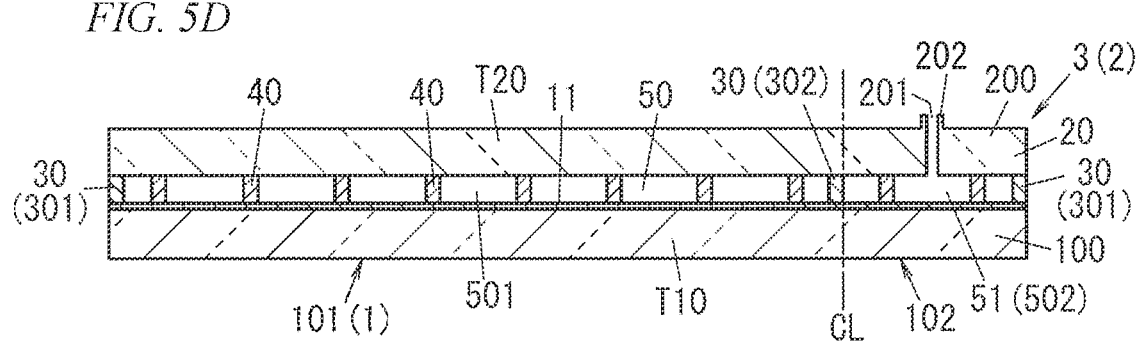
Figure 6A:
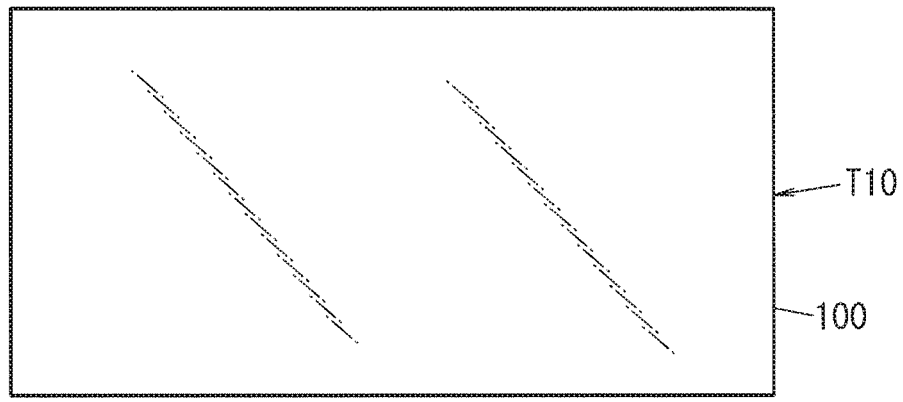
FIGS. 6A-6C illustrate an exemplary series of manufacturing process steps of a glass panel unit according to the first embodiment of the present invention, and are more specifically plan views illustrating intermediate products obtained while the glass panel unit is being formed.
Figure 6B:
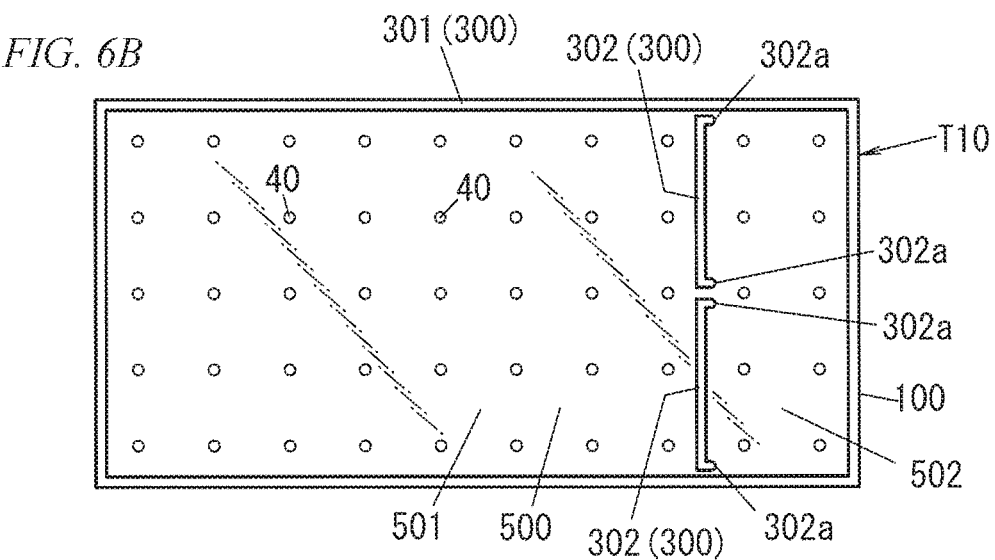
Figure 6C:
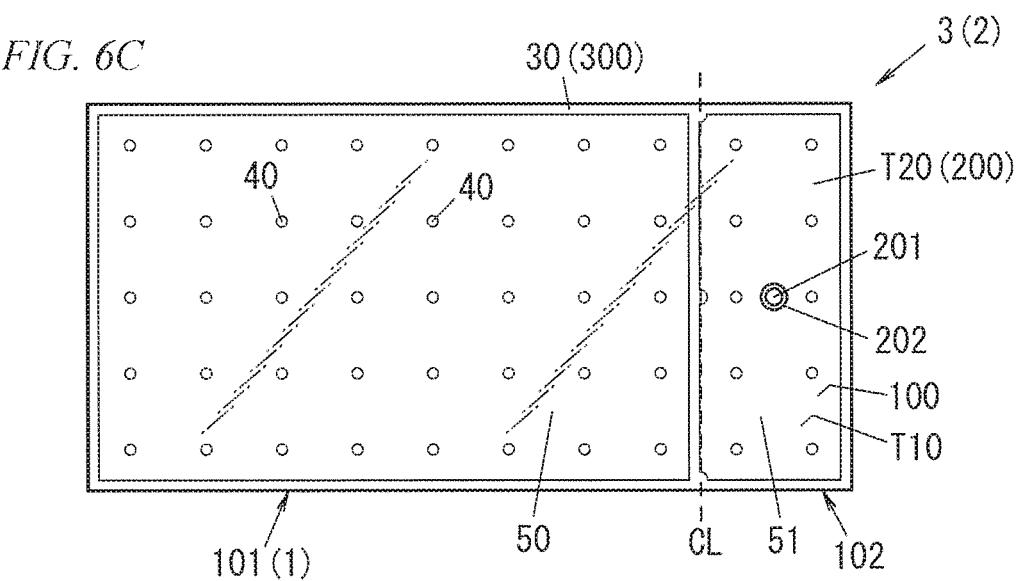

FIGS. 5A-5D and FIGS. 6A-6C illustrate an exemplary manufacturing process of the glass panel unit 1 according to this embodiment. Specifically, FIGS. 5A-5D are cross-sectional views illustrating respective intermediate products obtained during the manufacturing process of the glass panel unit 1, while FIGS. 6A-6C are plan views. FIG. 6C illustrates internal members just like FIG. 1B. The glass panel unit 1 may be manufactured by the exemplary process illustrated in FIGS. 5A-5D and FIGS. 6A-6C. Note that each of FIGS. 5A-5D illustrates the members and materials of the glass panel unit 1 of FIG. 1A upside down. That is to say, FIGS. 5A-5D are drawn such that the first panel T1 is located under the second panel T2.

The manufacturing process of the glass panel unit 1 includes a panel providing process step, a spacer arrangement process step, an adhesive disposition process step, a panel arrangement process step, an evacuation process step, and a bonding process step. The panel providing process step is a process step of providing a first panel T10 including at least a first glass plate 100 and a second panel T20 including at least a second glass plate 200. The spacer arrangement process step is a process step of arranging spacers 40 such that the spacers 40 are interposed between the first panel T10 and the second panel T20, and is also a process step of arranging the spacers 40 on either the first surface T101 of the first panel T10 or the first surface T201 of the second panel T20. The adhesive disposition process step is a process step of disposing a glass adhesive 300 on either the first surface T101 of the first panel T10 or the first surface T201 of the second panel T20. The panel arrangement process step is a process step of arranging the first panel T10 and the second panel T20 such that these panels T10 and T20 face each other. The evacuation process step is a process step of creating a vacuum space 50, enclosing the spacers 40 therein, by evacuating the space between the first panel T10 and the second panel T20. The bonding process step is a process step of bonding respective peripheral portions of the first panel T10 and the second panel T20 together with a frame member 30 by curing the glass adhesive 300.

As for the first panel T10, the first glass plate 100, the second panel T20, and the second glass plate 200 for use in this manufacturing process, see detailed description of the first panel T1, the first glass plate 10, the second panel T2, and the second glass plate 20 of the glass panel unit 1, respectively. The other members designated by the same reference numerals as their counterparts of the glass panel unit 1 will not be described in detail again, either, because such members have already been described for the glass panel unit 1.

When the spacer arrangement process step and the adhesive disposition process step are performed, the glass adhesive 300 is directly disposed on the very surface on which the spacers 40 are arranged. The first panel T10 has a first surface T101 and a second surface T102. The first surface T101 is a surface to contact with the spacers 40, while the second surface T102 is a surface located outside with respect to the first surface T101. The second panel T20 also has a first surface T201 and a second surface T202. The first surface T201 is a surface to contact with the spacers 40, while the second surface T202 is a surface located outside with respect to the first surface T201. Also, when the panel arrangement process step is performed, the first surface T101 faces the first surface T201 with the spacers 40 interposed between them.

During the manufacturing process of the glass panel unit 1, a glass composite 2 including the first panel T10, the second panel T20, the glass adhesive 300, and the spacers 40 is obtained as an intermediate product. The glass composite 2 is shown in FIG. 5C. In this glass composite 2, the glass adhesive 300 has not been cured yet.

At the beginning of the manufacturing process of the glass panel unit 1, first of all, the first panel T10 and the second panel T20 are provided. The first panel T10 provided is illustrated in FIGS. 5A and 6A. The first panel T10 may include not only the first glass plate 100 but also a thermal reflective film 11 provided on the surface of the first glass plate 100 as well. The outer surface of the first glass plate 100, located opposite from the surface covered with the thermal reflective film 11 and out of contact with the spacers 40, may agree with the second surface T102 of the first panel T10. If the first panel T10 includes the thermal reflective film 11, then the thermal reflective film 11 may be provided on the surface of the first glass plate 100 with a laminator, for example, in a process step preceding the panel providing process step. Optionally, the panel providing process step may include adjusting the size of the first panel T10 to an appropriate one and loading the first panel T10 into a predetermined apparatus.

Although only the first panel T10 is illustrated in FIGS. 5A and 6A, the second panel T20 is also provided separately. Providing the second panel T20 includes providing a second panel T20 of a predetermined size so that the second panel T20 may be paired with the first panel T10, i.e., providing such a second panel T20 as having the same size as the first panel T10 in a plan view. As used herein, "having the same size" includes having substantially the same size. Optionally, just like the first panel T10, the second panel T20 may further include a thermal reflective film. If the second panel T20 includes no thermal reflective films as shown in FIG. 5C, then the second panel T20 may consist of the second glass plate 200 alone. In that case, the surface of the second glass plate 200 in contact with the spacers 40 may agree with the first surface T201 of the second panel T20. Furthermore, the outer surface of the second glass plate 200, located opposite from the first surface T201, may agree with the second surface T202 of the second panel T20. FIG. 5C illustrates a state where the second panel T20 is supported by the spacers 40 and arranged over the first panel T10. The second panel T20 has a through hole 205 running through the second panel T20 in the thickness direction thereof. The second surface T202 of the second panel T20 is provided with an exhaust pipe 202. In this case, the through hole 205 is connected to the channel of the exhaust pipe 202, thereby forming an exhaust port 201. Providing the second panel T20 may include cutting the through hole 205 through the second panel T20 and providing the exhaust pipe 202 for the second panel T20.

Speaking of the panel size, the size of the first panel T10 and the second panel T20 provided at the beginning of the manufacturing process is set to be larger than that of the first panel T1 and the second panel T2 of the glass panel unit 1 as a final product. In this exemplary manufacturing process, the first panel T10 and the second panel T20 may be partially removed ultimately. Each of the first panel T10 and the second panel T20 for use in the manufacturing process includes a portion to be the glass panel unit 1 and a portion to be removed ultimately.

Next, as shown in FIGS. 5B and 6B, the glass adhesive 300 is disposed (in the adhesive disposition process step). The spacers 40 may be arranged along with the glass adhesive 300 being disposed. The glass adhesive 300 contains hot melt glass. The glass adhesive 300 is disposed in the shape of a frame onto the peripheral portion of the first panel T10 or the second panel T20 extending along the edges thereof. The glass adhesive 300 is ultimately cured and bonded to the first panel T10 and the second panel T20.

The glass adhesive 300 includes at least two types of glass adhesives (hereinafter referred to as a "first glass adhesive 301" and a "second glass adhesive 302", respectively).

The first glass adhesive 301 contains hot melt glass, which is also called "low-melting glass." The first glass adhesive 301 may be a glass frit containing hot melt glass, for example. Examples of the glass frits include a bismuth-based glass frit (i.e., a glass frit including bismuth), a lead-based glass frit (i.e., a glass frit including lead), and a vanadium-based glass frit (i.e., a glass frit including vanadium). These are examples of low-melting glass. Using the low-melting glass lessens the thermal damage to be done on the spacers 40 during the manufacturing process of the glass panel unit 1.

The second glass adhesive 302 contains hot melt glass, which is also called "low-melting glass". The second glass adhesive 302 may be a glass frit including hot melt glass, for example. Examples of the glass frits include a bismuth-based glass frit (i.e., a glass frit including bismuth), a lead-based glass frit (i.e., a glass frit including lead), and a vanadium-based glass frit (i.e., a glass frit including vanadium). These are examples of low-melting glass. Using the low-melting glass lessens the thermal damage to be done on the spacers 40 during the manufacturing process of the glass panel unit 1. The second glass adhesive 302 is a different glass adhesive from the first glass adhesive 301. In this case, the second glass adhesive 302 may have such a property as being integrated with the first glass adhesive 301 when the glass composite 2 is heated as will be described later.

The first glass adhesive 301 and the second glass adhesive 302 are disposed at respectively predetermined locations. In FIG. 5B, the second glass adhesive 302 is indicated by the dotted rectangle. That is to say, the first glass adhesive 301 is continuously disposed on the first surface T101 along the edges of the first panel T10. Also, in a plan view, the second glass adhesive 302 is disposed discontinuously in a straight line parallel to the shorter sides of the first panel T10 so as to be located inside, and surrounded with, the first glass adhesive 301. In FIG. 6B, the first glass adhesive 301 is continuously disposed along the edges of the first panel T10, and the second glass adhesive 302 is disposed discontinuously in a straight line parallel to the shorter sides of the first panel T10. In the state shown in FIG. 6B, the second glass adhesive 302 is not connected to the first glass adhesive 301.

After the first glass adhesive 301 and the second glass adhesive 302 have been disposed, pre-baking may be performed. Pre-baking allows each of the first glass adhesive 301 and the second glass adhesive 302 to be integrated together. Nevertheless, during the pre-baking process, the first glass adhesive 301 and the second glass adhesive 302 are still out of contact with each other. Pre-baking decreases the chances of unintentionally and carelessly scattering the glass adhesive 300. This probably means that the pre-baking process imparts a sufficient degree of rigidity, which is high enough to allow the first glass adhesive 301 and the second glass adhesive 302 to withstand the evacuation process step, to the first glass adhesive 301 and the second glass adhesive 302. Optionally, during the pre-baking process, the first glass adhesive 301 and the second glass adhesive 302 may be fixed onto the first panel T10. Pre-baking may be carried out by heating the glass adhesive 300 to a temperature lower than the melting temperature thereof.

The spacers 40 are suitably arranged after the glass adhesive 300 has been disposed. This facilitates the arrangement of the spacers 40. The spacers 40 may be arranged at regular intervals. Alternatively, the spacers 40 may also be dispersed irregularly. If the spacers 40 are formed of a film, the spacers 40 may be formed by punching the film to a predetermined size in advance. The spacers 40 may be arranged with a chip mounter, for example. Optionally, the spacers 40 may be formed by a known thin film deposition process.

The spacers 40 are suitably formed of at least one polyimide film. The spacers 40 may also be formed of a stack of two or more polyimide films. If the spacers 40 are formed of such a stack of films, then a plurality of films are suitably stacked one upon the other and bonded together in advance. In that case, the films included in the stack may be bonded together with an adhesive, or via the tackiness of the films themselves, or with electrostatic force.

In FIG. 5B, the glass adhesive 300 is directly disposed on the first panel T10. Alternatively, the glass adhesive 300 may also be directly disposed on the second panel T20. Still alternatively, after the first panel T10 and the second panel T20 have been arranged to face each other, the glass adhesive 300 may be injected into the gap between the first panel T10 and the second panel T20. In that case, the first glass adhesive 301 is suitably injected after the second glass adhesive 302 has been injected. If the glass adhesive 300 is injected in this manner, the glass adhesive 300 may be introduced so as to come into contact with both of the first panel T10 and the second panel T20 as soon as the glass adhesive 300 is injected.

Optionally, a gas adsorbent may be disposed on one or both of the first surface T101 and the first surface T201. In that case, a solid gas adsorbent may be fixed inside the glass panel unit 1 or a gas adsorbent material with fluidity may also be supplied and dried so that the gas adsorbent material is disposed inside the glass panel unit 1.

As shown in FIG. 6B, the first glass adhesive 301 is disposed continuously in the peripheral portion of the first panel T10 extending along the edges thereof. The first glass adhesive 301 is formed, on the first surface T101, in the shape of a continuous frame that makes one round of the first panel T10 along the edges thereof. The second glass adhesive 302 is provided so as to be located at an end of the glass panel unit 1 as a final product. The second glass adhesive 302 is disposed to be surrounded with, and located inside, the first glass adhesive 301 in a plan view.

In FIG. 6B, two pieces of the second glass adhesive 302 are arranged in a straight line parallel to the shorter sides of the glass panel unit 1. The number of pieces of the second glass adhesive 302 may also be one or three or more. Those pieces of the second glass adhesive 302 are arranged to form a wall. When the second panel T20 is laid upon the first panel T10 as shown in FIG. 5C, an inner space 500 (hereinafter sometimes referred to as a "first inner space 500") is formed between the first panel T10 and the second panel T20. The second glass adhesive 302 partitions the inner space 500 into two. Note that the second glass adhesive 302 does not completely partition the inner space 500 into two inner spaces 500, 500 but is disposed such that those two inner spaces 500, 500 communicate with each other. Of these two inner spaces 500, 500 partitioned, the inner space 500 located more distant from the exhaust port 201 is defined herein to be a first space 501, while the inner space 500 located closer to the exhaust port 201 is defined herein to be a second space 502. The second glass adhesive 302 is located between the first space 501 and the second space 502. Over the second space 502, located is the exhaust port 201 cut through the second panel T20 (see FIG. 5C). Thus, there are no exhaust ports 201 over the first space 501. In the exemplary manufacturing process step such as the one shown in FIG. 6B, the second glass adhesive 302 is out of contact with the first glass adhesive 301, and the two pieces of the second glass adhesive 302 are spaced from each other, thus allowing the first space 501 and the second space 502 to communicate with each other. The gaps between the first glass adhesive 301 and the second glass adhesive 302 and the gap between the two pieces of the second glass adhesive 302 serve as air passages during the evacuation. In the evacuation process step, air in the first space 501 is exhausted through the air passages.

Next, as shown in FIG. 5C, the second panel T20 is mounted on the glass adhesive 300 so as to face the first panel T10 (i.e., the panel arrangement process step is performed), thus forming a glass composite 2 including the first panel T10, the second panel T20, the glass adhesive 300, and the spacers 40. The glass composite 2 has the inner space 500 between the first panel T10 and the second panel T20. As already described with reference to FIG. 6B, the inner space 500 is partitioned by the second glass adhesive 302 into two. In FIG. 5C, the second glass adhesive 302 is indicated by the dotted rectangle. Note that the second glass adhesive 302 does not completely partition the inner space 500 into two.

Then, the glass composite 2 is heated. The glass composite 2 may be heated in a heating furnace. Heating causes a rise in the temperature of the glass composite 2, thus heating the glass adhesive 300 as well. In this case, melting the glass in the glass adhesive 300 allows the glass adhesive 300 to express adhesiveness. The glass contained in the glass adhesive 300 may have a melting temperature higher than 300° C., for example. The melting temperature of such glass may be higher than 400° C. Nevertheless, the lower the melting temperature of the glass contained in the glass adhesive 300 is, the more advantageous it is to perform the process step of heating the glass composite 2 (hereinafter also referred to as a "heating process step") smoothly. For this reason, the melting temperature of the glass is suitably equal to or less than 400° C., more suitably 360° C. or less, even more suitably 330° C. or less, and most suitably 300° C. or less. The melting temperature of the glass contained in the first glass adhesive 301 is suitably different from that of the glass contained in the second glass adhesive 302.

The heating process step suitably includes two or more stages. For example, the heating process step may include a first stage in which the glass contained in the first glass adhesive 301 is melted by heating the furnace and a second stage in which the glass contained in the second glass adhesive 302 is melted by further heating the furnace.

In the heating process step, the glass in the first glass adhesive 301 melts at a lower temperature than the glass in the second glass adhesive 302. In other words, the glass in the first glass adhesive 301 melts earlier than the glass in the second glass adhesive 302. In the first stage, the glass in the first glass adhesive 301 does melt, but the glass in the second glass adhesive 302 does not. Melting of the glass in the first glass adhesive 301 allows the first glass adhesive 301 to bond the first panel T10 and the second panel T20 together. The temperature at which the glass in the first glass adhesive 301 melts but the glass in the second glass adhesive 302 does not melt is defined to be a first melting temperature. Since the glass in the second glass adhesive 302 does not melt at the first melting temperature, the shape of the second glass adhesive 302 is maintained.

While the heating process step is being performed, the evacuation process step may be started in the middle. Specifically, after the temperature in the first stage has reached the first melting temperature, the evacuation process step may be started to evacuate the inner space 500. In that case, the evacuation process step may be performed after the temperature has been lower than the first melting temperature (such a temperature will be hereinafter referred to as an "evacuation starting temperature"). Alternatively, the evacuation process step may be started even before the first melting temperature is reached, unless the glass composite 2 (particularly the first glass adhesive 301) is deformed.

The evacuation process step may be performed with a vacuum pump connected to the exhaust port 201. In this case, the vacuum pump may be connected to a pipe extending from the exhaust pipe 202. The evacuation process step reduces the pressure in the inner space 500 to turn the inner space 500 into a vacuum space 50. Note that such an evacuation process step is only an exemplary process step for the manufacturing process of this embodiment. That is to say, the evacuation process step may be performed by a different evacuation method. For example, the evacuation process step may also be performed with the glass composite 2 disposed in a chamber and with the pressure in the chamber reduced.

In FIG. 5C, the direction in which the gas in the inner space 500 is released through the exhaust port 201 is indicated by the upward arrow. In addition, in FIG. 5C, the direction in which the gas flows from the first space 501 to the second space 502 during the evacuation process step is indicated by the rightward arrows. Since the second glass adhesive 302 is disposed to provide air passages as described above, the gas in the inner space 500 passes through those air passages to be exhausted through the exhaust port 201. This creates a vacuum space 50 out of the inner space 500 including the first space 501 and the second space 502.

After the degree of vacuum in the inner space 500 has reached a predetermined value to maintain the vacuum space 50, the glass in the second glass adhesive 302 is melted by further heating the glass composite 2 (which is the second stage). While the temperature of the glass composite 2 is being increased to an appropriate temperature for the second stage, the evacuation process step may be performed continuously. The temperature in the second stage is set at a second melting temperature, which is higher than the first melting temperature. The second melting temperature may be higher than the first melting temperature by 10-100° C., for example.

Optionally, the glass adhesive 300 may have such a property that melting of the glass in the glass adhesive 300, i.e., softening of the hot melt glass under the heat, allows the glass adhesive 300 to be deformed or bonded. In that case, the glass adhesive 300 (particularly, the first glass adhesive 301) does not have to exhibit fluidity that causes the glass to flow out of the glass composite 2 during the heating process step.

At the second melting temperature, the glass in the second glass adhesive 302 melts. This allows the second glass adhesive 302, heated to the second melting temperature, to bond the first panel T10 and the second panel T20 together. Furthermore, the second glass adhesive 302 may be deformed to close the air passages. In this exemplary manufacturing process, the gaps (i.e., the air passages) left between the first glass adhesive 301 and the second glass adhesive 302 are closed. In addition, the gap (i.e., the air passage) left between the two pieces of the second glass adhesive 302 that are arranged in a straight line is also closed. Each piece of the second glass adhesive 302 has a pair of closing portions 302a at both ends thereof (see FIG. 6B). Such closing portions 302a are formed by increasing the amount of the second glass adhesive 302 applied. Providing such closing portions 302a for the second glass adhesive 302 facilitates closing the air passages. The closing portions 302a are arranged to extend toward the second space 502 parallel to the longer sides of the glass panel unit 1. Deforming the closing portions 302a closes the air passages described above. Note that the bonding process step may be performed in parallel with the first and second stages of the heating process step and the evacuation process step. In this exemplary manufacturing process, the evacuation process step may be started in the middle of the bonding process step.

As described above, the glass panel unit 1 may be manufactured through a thermal process. In this case, the high heat resistance of the polyimide as a constituent material for the spacers 40 reduces the collapse of the spacers 40.

FIGS. 5D and 6C illustrate how the glass composite 2 looks after the air passages have been closed. The glass composite 2 is integrated together due to the adhesion action of the glass adhesive 300, thus forming a frame member 30. The glass composite 2 thus integrated serves as a panel as an intermediate product (hereinafter defined as an "integrated panel 3").

The bonding process step completely divides the inner space 500 into the first space 501 and the second space 502 via the second glass adhesive 302. Then, the vacuum space 50 is maintained in the first space 501. Deformation of the second glass adhesive 502 creates the vacuum space 50, which is formed of the first space 501. After the bonding process step, the vacuum space 50 is sealed hermetically by the cured product of the first glass adhesive 301 and the cured product of the second glass adhesive 302.

In the integrated panel 3, the cured product of the first glass adhesive 301 and the cured product of the second glass adhesive 302 are integrated together to form the frame member 30, which surrounds the vacuum space 50 in a plan view. A portion of the frame member 30 located closer to the exhaust port 201 surrounds the second space 502 in a plan view. Part of the cured product of the first glass adhesive 301 and part of the cured product of the second glass adhesive 302 form a portion of the frame member 30 located closer to the first space 501. The rest of the cured product of the first glass adhesive 301 and the rest of the cured product of the second glass adhesive 302 form the portion of the frame member 30 located closer to the second space 502.

After the vacuum space 50 has been created, the integrated panel 3 is cooled. Also, after the vacuum space 50 has been created, the evacuation process step is stopped. Sealing the vacuum space 50 hermetically with the cured product of the glass adhesive 300 allows the vacuum space 50 to be maintained even though the evacuation process step is no longer performed. In any case, the evacuation process step is stopped for safety after the integrated panel 3 has been cooled. Optionally, a gas may be supplied to the second space 502 after the evacuation process step has been performed.

Finally, the integrated panel 3 is cut off. The integrated panel 3 includes a portion including the first space 501 to be the glass panel unit 1 (hereinafter defined as a "glass panel unit portion 101") and an unnecessary portion including the second space 502 (hereinafter defined as an "unnecessary portion 102"). The glass panel unit portion 101 includes the vacuum space 50. The unnecessary portion 102 has the exhaust port 201.

In FIGS. 5D and 6C, the cutting line of the integrated panel 3 is indicated by the broken line (i.e., the cutting line CL). The integrated panel 3 may be cut off along the outer edge of the frame member 30 for the glass panel unit portion 101 to be the glass panel unit 1 eventually. Alternatively, the integrated panel 3 may also be cut off along any other appropriate line unless the vacuum space 50 is destroyed. Optionally, the integrated panel 3 may be left uncut. In that case, the unnecessary portion 102 may be used as a portion of the glass panel unit 1.

If the integrated panel 3 is cut off, the unnecessary portion 102 is removed from the integrated panel 3, thus obtaining the glass panel unit portion 101. This glass panel unit portion 101 becomes the glass panel unit 1 as shown in FIGS. 1A and 1B. Cutting off the first panel T10 and the second panel T20 of the integrated panel 3 forms a cut face on each of the first panel T1 and the second panel T2 of the glass panel unit 1.

As can be seen, the manufacturing process of the glass panel unit 1 suitably further includes such a cutting process step of cutting off the first panel T10 and the second panel T20 after the bonding process step. By cutting off the first panel T10 and the second panel T20, a glass panel unit 1 with no exhaust ports 201 may be obtained easily. In the glass panel unit 1 thus obtained, the first panel T10, the first glass plate 100, the second panel T20, and the second glass plate 200 that have been used to manufacture the glass panel unit 1 respectively serve as the first panel T1, the first glass plate 10, the second panel T2, and the second glass plate 20 described above.

Figure 7A:
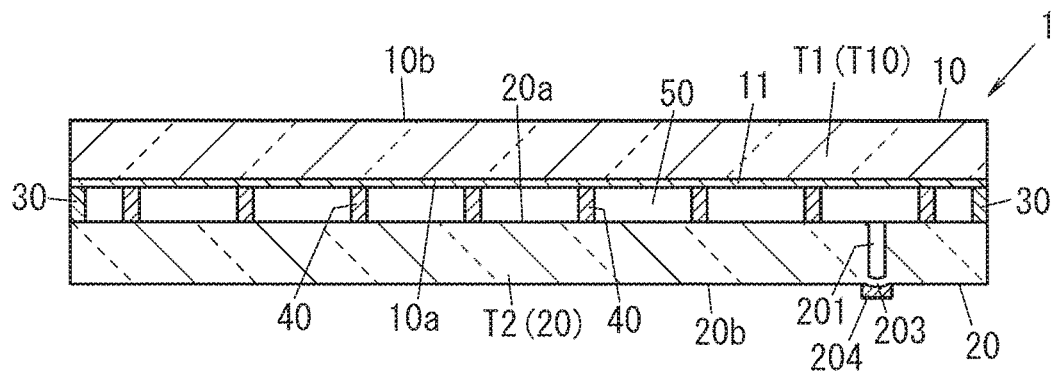
FIG. 7A is a cross-sectional view illustrating a variation of a glass panel unit according to the first embodiment of the present invention.
Figure 7B:
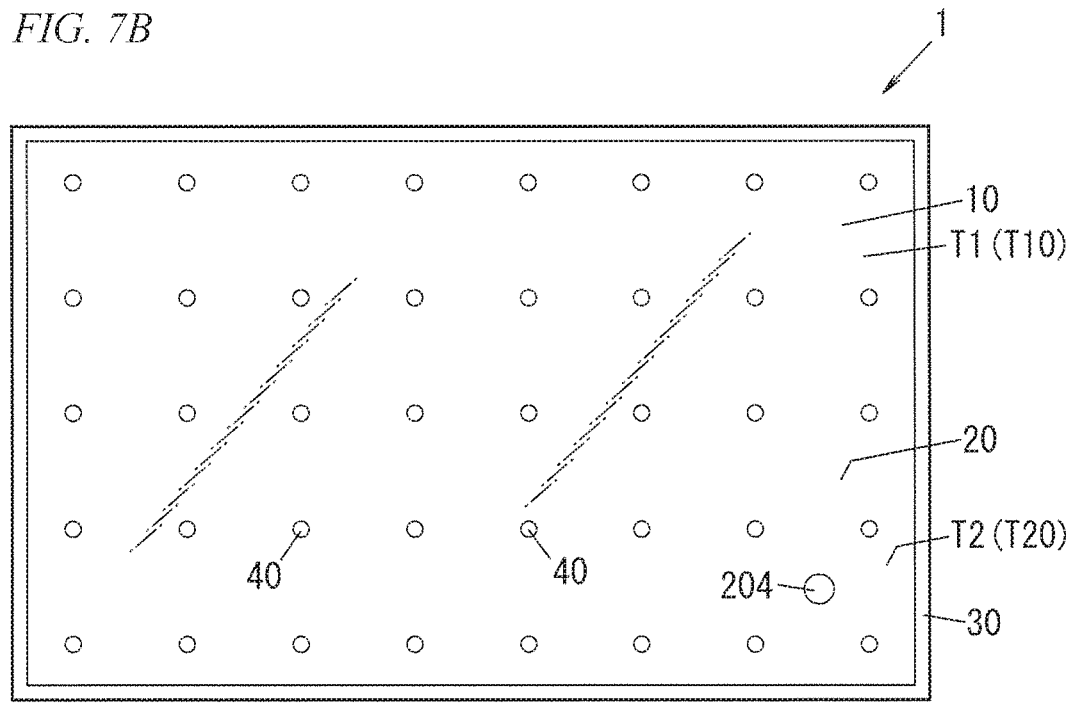
FIG. 7B is a plan view illustrating the variation of the glass panel unit.

FIGS. 7A and 7B illustrate a variation of the glass panel unit 1 according to this embodiment. In the following description, any constituent member of this variation having the same function as the counterpart of the embodiment described above will be designated by the same reference numeral as that counterpart's, and a detailed description thereof will be omitted herein. In this glass panel unit 1, the outer one of the two ends of the exhaust port 201 in the evacuation direction is closed with a sealing portion 203, while the inner end thereof is connected to the vacuum space 50. In this case, the exhaust port 201 refers to the port used in the evacuation process step to create the vacuum space 50.

The outer end of the exhaust port 201 is closed with the sealing portion 203, thus allowing the vacuum space 50 to be maintained. The sealing portion 203 is formed of the exhaust pipe 202 (see FIG. 5C). The sealing portion 203 may be formed by heat-melting the glass as a constituent material for the exhaust pipe 202 when the exhaust pipe 202 is cut off. The sealing portion 203 is covered with a cap 204, which is arranged outside the sealing portion 203. Covering the sealing portion 203 with the cap 204 increases the degree of closedness (i.e., airtightness) of the exhaust port 201. The cap 204 also reduces the damage to be done to the sealing portion 203, especially around the exhaust port 201.

The glass panel unit 1 shown in FIGS. 7A and 7B may be manufactured basically by the manufacturing process of the integrated panel 3 described above (see FIGS. 5A-5D and FIGS. 6A-6C). More specifically, the glass panel unit 1 may be formed by sealing the exhaust port 201 of the integrated panel 3 with the sealing portion 203, obtained by heat-melting the exhaust pipe 202, and the cap 204. In that case, there is no need to cut out a portion with the exhaust port 201 from the integrated panel 3 shown in FIG. 5D. In addition, the second glass adhesive 302 does not have to be used, either. Such a glass panel unit 1 may be easier to make, because there is no need to remove such a portion with the exhaust port 201.

The glass panel unit 1 such as the one shown in FIGS. 7A and 7B may be used in, for example, glass windows, partitions, signage panels, and showcases (such as refrigerating showcases and food warming showcases). If the glass panel unit 1 is applied to a glass window, the glass window may include the glass panel unit 1 and a window frame fitted to the outer peripheral portion of the glass panel unit 1 extending along the edges thereof. In such a glass window, the second surface T12 of the first panel T1 may be exposed outdoors. In that case, an infrared ray incident in the thickness direction will be cut off more easily at least by the vacuum space 50. Also, if the first panel T1 includes not only the first glass plate 10 but also the thermal reflective film 11 as described above, such an infrared ray incident in the thickness direction will be cut off even more easily.

Second Embodiment

Figure 8A:
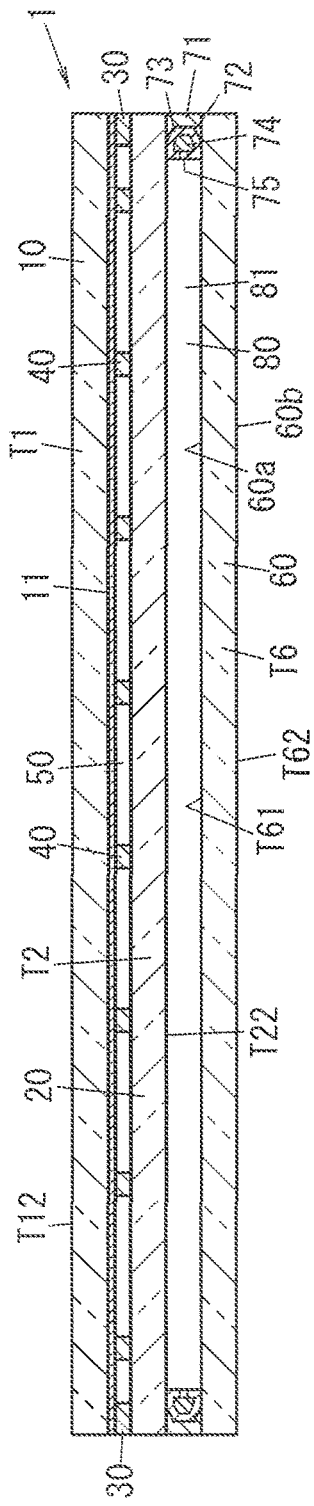
FIG. 8A is a cross-sectional view illustrating an exemplary glass panel unit according to a second embodiment of the present invention.
Figure 8B:
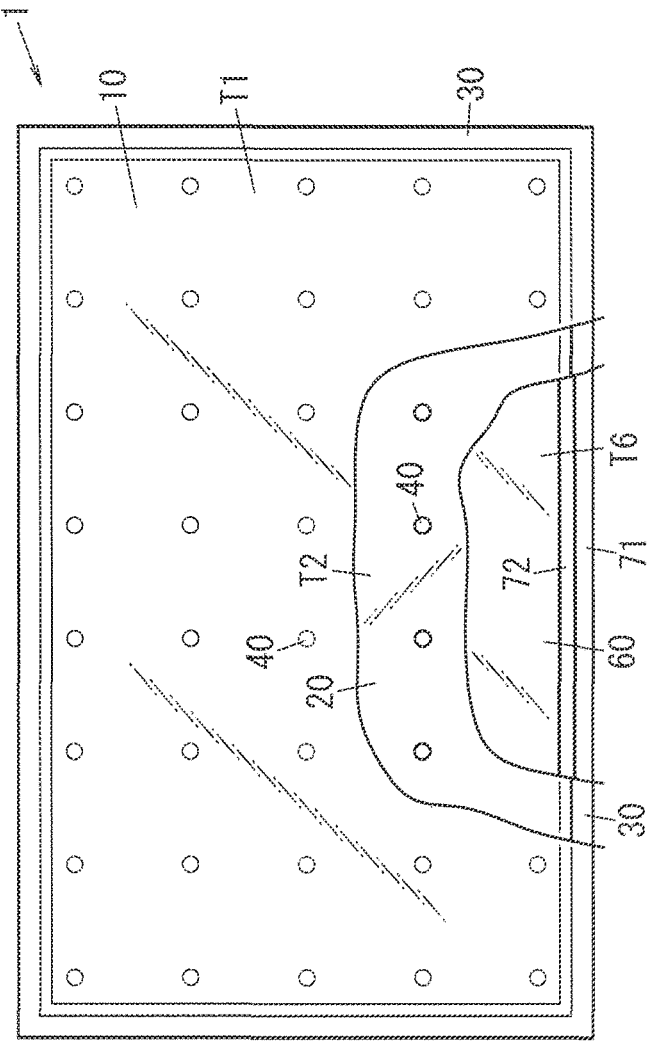
FIG. 8B is a plan view illustrating a specific example of the glass panel unit.

FIGS. 8A and 8B illustrate an exemplary glass panel unit 1 according to this embodiment. Specifically, FIG. 8A illustrates a cross-sectional view of the exemplary glass panel unit 1 according to this embodiment, and FIG. 8B is a plan view illustrating the details of the exemplary glass panel unit 1 according to this embodiment. In the following description, any constituent member of the second embodiment having the same function as its counterpart of the first embodiment will be designated by the same reference numeral as that counterpart's, and a detailed description thereof will be omitted herein.

The glass panel unit 1 according to this embodiment includes the first panel T1 including at least the first glass plate 10, the second panel T2 including at least the second glass plate 20, the frame member 30, the spacers 40, and the vacuum space 50 as described above. The glass panel unit 1 further includes a third panel T6, a sealer member 71, and a dry gas space 81. The third panel T6 includes at least a third glass plate 60. The sealer member 71 is located opposite from the vacuum space 50 in the thickness direction to hermetically seal the gap between a peripheral portion of at least one selected from the group consisting of the first panel T1 and the second panel T2 extending along edges thereof and a peripheral portion of the third panel T6 extending along edges thereof. The dry gas space 81 is formed by filling an inner space 80, which is surrounded with the sealer member 71 in the shape of a frame in a plan view (and which will be hereinafter referred to as a "second inner space 80"), with a dry gas. The third panel T6 faces either the first panel T1 or the second panel T2. The frame-shaped sealer member 71 is different from the frame member 30. Providing not only the vacuum space 50 but also the dry gas space 81 for the glass panel unit 1 further improves the thermal insulation properties of the glass panel unit 1.

The third panel T6 is arranged such that one of the first panel T1 or the second panel T2 is interposed, via the sealer member 71, between the other of the first panel T1 or the second panel T2 and the third panel T6. The sealer member 71 is formed in the shape of a frame corresponding in shape to a peripheral portion of the third panel T6 extending along the edges thereof. In the example illustrated in FIG. 8A, the third panel T6 is arranged such that the second panel T2 is interposed, via the sealer member 71, between the first panel T1 and the third panel T6. In this case, the frame-shaped sealer member 71 is joined to the peripheral portion of the second panel T2 and the peripheral portion of the third panel T6. In another example, the third panel T6 may be arranged such that the first panel T1 is interposed, via the sealer member 71, between the third panel T6 and the second panel T2. In that case, the frame-shaped sealer member 71 may be joined to the peripheral portion of the first panel T1 and the peripheral portion of the third panel T6. In still another example, a pair of third panels T6 may be arranged on both sides in the thickness direction with a sealer 71 interposed between each third panel T6 and the first or second panel T1, T2. In that case, of the pair of third panels T6, T6 arranged on both sides in the thickness direction, the peripheral portion of one third panel T6 and the peripheral portion of the first panel T1 may be joined together with a frame-shaped sealer member 71. Likewise, the peripheral portion of the other third panel T6 and the peripheral portion of the second panel T2 may be bonded together with a frame-shaped sealer member 71. Examples of materials for the sealer member 71 include a silicone resin and butyl rubber. Each of these resins is sometimes called a "highly airtight resin", which is able to highly airtightly seal the dry gas space 81 provided between the two panels. That is to say, the frame-shaped sealer member 71 is able to highly airtightly seal the dry gas space 81 provided between the two panels (e.g., the second panel T2 and the third panel T6 in the example illustrated in FIG. 8A). The dry gas space 81 is suitably airtightly sealed with the cured product of the sealer member 71.

The glass panel unit 1 may further include a drying member 72, which is arranged along the inner periphery of the sealer member 71 having a frame shape in a plan view. The drying member 72 includes a body 73 defining the shape of the drying member 72 and a desiccant 74 arranged inside the body 73. The body 73 may have a moisture absorbing hole 75, which connects the dry gas space 81 to the desiccant 74. This allows the desiccant 74 to contact with the dry gas space 81 through the moisture absorbing hole 75. The drying member 72 may be in contact with at least one side of the frame-shaped sealer member 71. In that case, the moisture absorbing hole 75 is not closed with the frame-shaped sealer member 71.

The body 73 may be made of a metallic material, which may be aluminum, for example. Examples of the desiccant 74 include a silica gel.

As shown in FIG. 8A, the inner space 80 provided between the second panel T2 and the third panel T6 is externally hermetically sealed with at least the frame-shaped sealer member 71. Also, the inner space 80 is filled with a dry gas. Examples of the dry gases include a dry rare gas, dry air, and a dry nitrogen gas. In particular, the rare gas may be an argon gas, for example.

The third panel T6 has a first surface T61 and a second surface T62. The first surface T61 is a surface to contact with the dry gas space 81, and the second surface T62 is an outer surface opposite from the first surface T61. The third glass plate 60 also has a first surface 60a and a second surface 60b. The second surface 60b is an outer exposed surface, and the first surface 60a is an inner surface opposite from the second surface 60b. In the glass panel unit 1, the first surface 60a of the third glass plate 60 may be provided with a thermal reflective film similar to the thermal reflective film 11. That is to say, the third panel T6 may include a thermal reflective film in addition to the third glass plate 60. Alternatively, the third panel T6 may have no thermal reflective films. That is to say, the third panel T6 may consist of the third glass plate 60 alone. In that case, the first surface 60a may agree with the first surface T61 of the third panel T6 and the second surface 60b may agree with the second surface T62 of the third panel T6.

The third glass plate 60 may have a thickness of 1-10 mm, for example. In this embodiment, the third glass plate 60 may be as thick as the second glass plate 20, which would facilitate the manufacturing process because the same glass plate may be used when the third glass plate 60 is as thick as the second glass plate 20. Examples of materials for the third glass plate 60 include soda lime glass, high strain point glass, chemically strengthened glass, no-alkali glass, quartz glass, Neoceram, and physically strengthened glass.

The glass panel unit 1 such as the one shown in FIGS. 8A and 8B may be used in, for example, glass windows, partitions, signage panels, and showcases (such as showcases and food warming showcases). If the glass panel unit 1 is applied to a glass window, the glass window may include the glass panel unit 1 and a window frame fitted to the outer peripheral portion of the glass panel unit 1 extending along the edges thereof. In such a glass window, the second surface T12 of the first panel T1 may be exposed outdoors. In that case, an infrared ray incident in the thickness direction will be cut off more easily at least by the vacuum space 50. Also, if the first panel T1 includes not only the first glass plate 10 but also the thermal reflective film 11 as described above, such an infrared ray incident in the thickness direction will be cut off even more easily. This would make the second panel, located closer to the inside of a building than the first panel T1, much less easily thermally expandable.

An exemplary manufacturing process of the glass panel unit 1 according to this embodiment will be described.

This manufacturing process includes the panel providing process step, the spacer arrangement process step, the adhesive disposition process step, the panel arrangement process step, the evacuation process step, and the bonding process step as described above. This manufacturing process further includes a third panel providing process step, a sealer member disposition process step, a third panel arrangement process step, a dry gas space creating process step, and a joining process step. The third panel providing process step is a process step of providing a third panel T6 including at least the third glass plate 60. In this case, the third panel T6 provided has such a size that the third panel T6 may be paired with either the first panel T1 or the second panel T2. The sealer member disposition process step is a process step of disposing a sealer member 71 having a frame shape such that the sealer member 71 is located opposite from the vacuum space 50 in the thickness direction and between a peripheral portion of at least one selected from the group consisting of the first panel T1 and the second panel T2 extending along edges thereof and a peripheral portion of the third panel T6 extending along edges thereof. Specifically, the sealer member disposition process step may be a process step of directly disposing the frame-shaped sealer member 71 on either the second surface T12 or the second surface T22. The third panel arrangement process step is a process step of arranging the third panel T6 such that the third panel T6 faces the first panel T1. Alternatively, the third panel arrangement process step may also be a process step of arranging the third panel T6 such that the third panel T6 faces the second panel T2. The dry gas space creating process step is a process step of creating a dry gas space 81 by filling, with a dry gas, an inner space 80 formed between at least one panel selected from the group consisting of the first panel T1 and the second panel T2 and the third panel T6 and surrounded with the frame-shaped sealer member 71. The joining process step is a process step of hermetically joining, with the frame-shaped sealer member 71, a peripheral portion of at least one panel selected from the group consisting of the first panel T1 and the second panel T2 extending along the edges thereof and a peripheral portion of the third panel T6 extending along the edges thereof. The frame-shaped sealer member 71 is different from the frame member 30. In this case, the frame-shaped sealer member 71 may be made of a different material from the frame member 30.

The third panel T6 is arranged such that one of the first panel T1 or the second panel T2 is interposed, via the sealer member 71, between the other of the first panel T1 or the second panel T2 and the third panel T6. The sealer member 71 is formed in the shape of a frame corresponding in shape to a peripheral portion of the third panel T6 extending along the edges thereof. To obtain a glass panel unit 1 such as the one illustrated in FIG. 8A, the third panel T6 may be arranged such that the second panel T2 is interposed, via the sealer member 71, between the first panel T1 and the third panel T6. In this case, the frame-shaped sealer member 71 may be joined to the peripheral portion of the second panel T2 and the peripheral portion of the third panel T6. In another example, the third panel T6 may also be arranged such that the first panel T1 is interposed, via the sealer member 71, between the third panel T6 and the second panel T2. In that case, the frame-shaped sealer member 71 may be joined to the peripheral portion of the first panel T1 and the peripheral portion of the third panel T6. In still another example, a pair of third panels T6 may be arranged on both sides in the thickness direction with the sealer member 71 interposed between each third panel T6 and the first or second panel T1, T2. In that case, of the pair of third panels T6, T6 arranged on both sides in the thickness direction, the peripheral portion of one third panel T6 and the peripheral portion of the first panel T1 may be bonded together with a frame-shaped sealer member 71. Likewise, the peripheral portion of the other third panel T6 and the peripheral portion of the second panel T2 may be bonded together with a frame-shaped sealer member 71. Examples of materials for the sealer member 71 include a silicone resin and butyl rubber. Each of these resins is sometimes called a "highly airtight resin," which is able to highly airtightly seal the dry gas space 81 provided between at least one panel selected from the group consisting of the first panel T1 and the second panel T2 and the third panel T6. That is to say, the sealer member 71 is able to highly airtightly seal the dry gas space 81 by being joined to the second panel T2 and the third panel T6. The dry gas space 81 is suitably airtightly sealed with the cured product of the sealer member 71.

The manufacturing process of this embodiment may further include a process step of arranging a drying member 72 along the inner periphery of the sealer member 71 having a frame shape when the glass panel unit 1 is viewed in plan. Such a process step will be hereinafter referred to as a "drying member arrangement process step." In that case, the drying member 72 may be in contact with the sealer member 71.

If the dry gas space 81 is formed between the second panel T2 and the third panel 6, at least one member selected from the group consisting of the sealer member 71 and the drying member 72 is arranged in advance in only a part of the peripheral portion of the third panel T6 in a plan view. In addition, a vent hole allowing the inner space 80 to communicate with the outer space is cut through the rest of the peripheral portion. The dry gas space 81 is formed by filling the inner space 80 with a dry gas through the vent hole. Thereafter, that part of the peripheral portion with the vent hole and without the sealer member 71 is hermetically joined with the sealer member 71, thereby sealing the dry gas space 81. The dry gas space 81 that has been sealed airtightly in this manner is surrounded with the frame-shaped sealer member 71. Alternatively, a plurality of drying members 72 may be arranged in advance along the peripheral portion of the third panel T6 in a plan view. Then, a dry gas space 81 is formed by filling the inner space 80 with a dry gas through a gap left between adjacent ones of the drying members 72, 72. Thereafter, the peripheral portion outside the drying members 72 is airtightly joined with the sealer member 71, thereby sealing the dry gas space 81. The dry gas space 81 thus sealed airtightly is surrounded with the frame-shaped sealer member 71. Still alternatively, the drying member 72 may be arranged in, at least, a part of the peripheral portion of the third panel T6 in a plan view, while the peripheral portion is joined airtightly with the sealer member 71 to seal the inner space 80. Thereafter, the gas in the inner space 80 surrounded with the sealer member 71 is dried with the desiccant 74, thereby defining the inner space 80 in the dry gas space 81 filled with the dry gas. In this case, when the dry gas space 81 is formed as described above, peripheral portions adjacent to each other in the thickness direction may be airtightly joined together with the frame-shaped sealer member 71. Specifically, as shown in FIG. 8A, the respective peripheral portions of the second panel T2 and the third panel T6 that are adjacent to each other in the thickness direction may be airtightly joined together with the frame-shaped sealer member 71.

Third Embodiment

Figure 9:
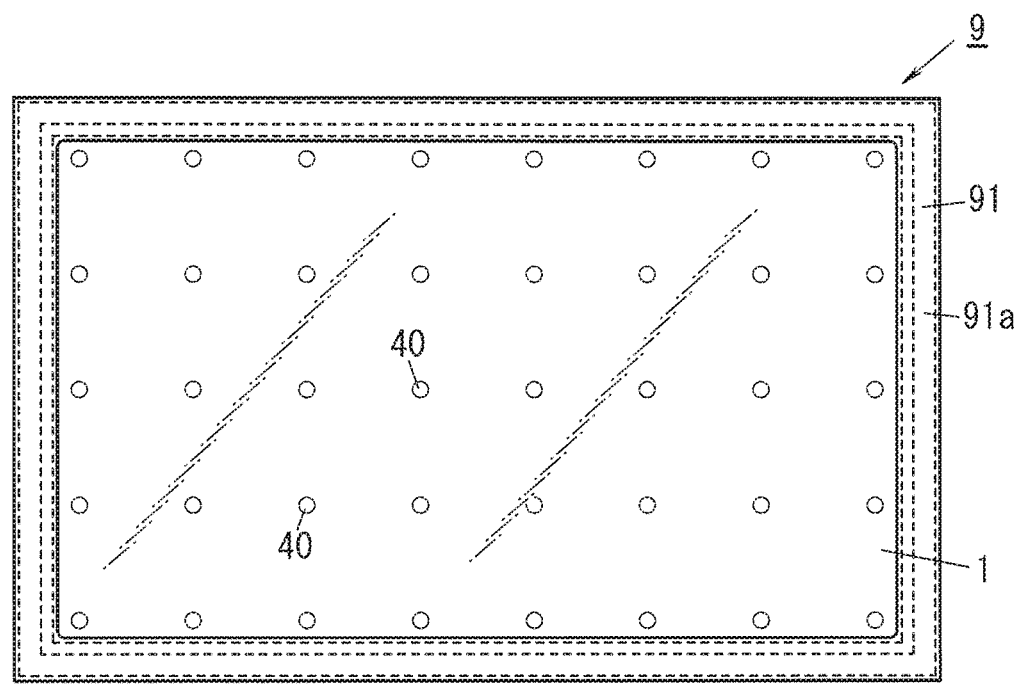
FIG. 9 is a plan view illustrating an exemplary glass window according to a third embodiment of the present invention.

FIG. 9 illustrates a plan view of an exemplary glass window 9 according to this embodiment. More specifically, FIG. 9 is an exemplary plan view of the glass window 9 in a situation where the spacers 40 are recognizable to the viewer.

The glass window 9 includes the glass panel unit 1 according to either the first embodiment or the second embodiment. The glass window 9 further includes a window frame 91 fitted to an outer peripheral portion of the glass panel unit 1 extending along the edges thereof.

The window frame 91 has an exposed surface 91a which is exposed externally. Thus, this glass window 9 may be fitted to some fixtures, for example, with the exposed surface 91a facing outside. Examples of the fixtures include wall openings, front doors, and indoor doors. If the glass window 9 is fitted to some fixture, then the second surface of one panel selected from the group consisting of the first panel T1, the second panel T2, and the third panel T6 may be exposed outside. Particularly when the glass window 9 is fitted such that the exposed surface 91a is exposed outdoors, the second surface T12 of the first panel T1 is suitably exposed outdoors. In that case, an infrared ray incident in the thickness direction will be cut off more easily at least by the vacuum space 50. Also, if the first panel T1 further includes the thermal reflective film 11 besides the first glass plate 10 as described above, the infrared ray incident in the thickness direction will be cut off even more easily. This would make the second panel, located closer to the inside of a building than the first panel T1, much less easily thermally expandable.

In the glass window 9, the glass panel unit 1 and the window frame 91 are suitably formed integrally. When the glass panel unit 1 and the window frame 91 are formed integrally, the window frame 91 may be fitted to the outside of the peripheral portion of the glass panel unit 1 extending along the edges thereof.

The window frame 91 may be either an integrally molded member or made up of a plurality of separately molded members. If the window frame 91 is an integrally molded member, then the window frame 91 and the glass panel unit 1 may be integrated together by fitting the window frame 91 to the outside of the peripheral portion of the glass panel unit 1 from the opposite side to the exposed surface 91a. On the other hand, if the window frame 91 is made up of a plurality of members, then the window frame 91 and the glass panel unit 1 may be integrated together by fitting the respective members to the outside of the peripheral portion of the glass panel unit 1.

REFERENCE SIGNS LIST

1 Glass Panel Unit
10 First Glass Plate
T1 First Panel
20 Second Glass Plate
T2 Second Panel
30 Frame Member
40 Spacer
50 Vacuum Space
300 Glass Adhesive

We claim:

1. A glass panel unit comprising:
a first panel including at least a first glass plate;
a second panel arranged to face the first panel and including at least a second glass plate;
a frame member formed in a shape of a frame, corresponding in shape to respective peripheral portions of the first panel and the second panel extending along edges thereof, and bonded to the peripheral portions; and
at least one spacer provided in a vacuum space between the first panel and the second panel,
the at least one spacer containing a polyimide,
the polyimide having an absorption edge at which an absorption index decreases in an optical absorption spectrum ranging from an ultraviolet ray to visible radiation, the absorption edge being equal to or less than 400 nm, and
the polyimide including a trifluoromethyl group or a fluorine group bonded to an aromatic ring contained in the polyimide.

2. The glass panel unit of claim 1, wherein the polyimide comprises an alicyclic structure.

3. The glass panel unit of claim 1, wherein the at least one spacer includes at least one film of the polyimide.

4. The glass panel unit of claim 1, wherein the at least one spacer includes a stack of films of the polyimide.

5. The glass panel unit of claim 1, wherein the frame member is made of a glass adhesive.

6. The glass panel unit of claim 1, further comprising:
- at least one third panel arranged to face the first panel and including at least a third glass plate;
- at least one sealer member having a frame shape different from a frame shape of the frame member and hermetically joining:
  - a peripheral portion of at least one selected from the group consisting of the first panel and the second panel, extending along edges thereof, and
  - a peripheral portion of the at least one third panel extending along edges thereof, the at least one sealer member being provided opposite from the vacuum space in a thickness direction of the glass panel unit; and
- a dry gas space created by filling an inner space, surrounded with the at least one sealer member in the frame shape in a plan view, with a dry gas.

7. A glass window comprising:
- the glass panel unit of claim 1; and
- a window frame fitted to outside of a peripheral portion of the glass panel unit extending along edges thereof.

* * * * *